United States Patent
Zimmerman et al.

(10) Patent No.: US 11,145,857 B2
(45) Date of Patent: Oct. 12, 2021

(54) HIGH CAPACITY POLYMER CATHODE AND HIGH ENERGY DENSITY RECHARGEABLE CELL COMPRISING THE CATHODE

(71) Applicant: IONIC MATERIALS, INC., Woburn, MA (US)

(72) Inventors: Michael A. Zimmerman, No. Andover, MA (US); Randy Leising, No. Andover, MA (US); Alexei B. Gavrilov, Woburn, MA (US); Keith Smith, Methuen, MA (US); Andy Teoli, Wilmington, MA (US)

(73) Assignee: IONIC MATERIALS, INC., Woburn, MA (US)

( * ) Notice: Subject to any disclaimer, the term of this patent is extended or adjusted under 35 U.S.C. 154(b) by 140 days.

(21) Appl. No.: 14/676,173

(22) Filed: Apr. 1, 2015

(65) Prior Publication Data

US 2015/0280218 A1   Oct. 1, 2015
US 2021/0257609 A9   Aug. 19, 2021

Related U.S. Application Data

(63) Continuation-in-part of application No. 14/559,430, filed on Dec. 3, 2014, now Pat. No. 9,742,008, which
(Continued)

(51) Int. Cl.
*H01M 4/36* (2006.01)
*H01M 4/38* (2006.01)
(Continued)

(52) U.S. Cl.
CPC .......... *H01M 4/364* (2013.01); *H01G 11/06* (2013.01); *H01G 11/48* (2013.01); *H01G 11/50* (2013.01);
(Continued)

(58) Field of Classification Search
CPC ............................. H01M 4/364; H01M 4/602
See application file for complete search history.

(56) References Cited

U.S. PATENT DOCUMENTS

| | | | |
|---|---|---|---|
| 2,638,489 A | 5/1953 | Ruben | |
| 3,257,241 A | 6/1966 | Tamminen | |
| (Continued) | | | |

FOREIGN PATENT DOCUMENTS

| | | |
|---|---|---|
| CN | 1285086 A | 2/2001 |
| CN | 1326596 C | 12/2001 |
| (Continued) | | |

OTHER PUBLICATIONS

Miyatake, Kenji, Hiroyuki Iyotani, Kimihisa Yamamoto, and Eishun Tsuchida. "Synthesis of Poly(phenylene Sulfide Sulfonic Acid) via Poly(sulfonium Cation) as a Thermostable Proton-Conducting Polymer." Macromolecules 29.21 (1996): 6969-971. ACS Publications. Web. Jun. 24, 2017.*
(Continued)

*Primary Examiner* — Stephan J Essex
(74) *Attorney, Agent, or Firm* — Preti Flaherty Beliveau & Pachios LLP

(57) ABSTRACT

The invention features a rechargeable cathode and a battery comprising the cathode. The cathode includes a solid, ionically conducting polymer material and electroactive sulfur. The battery contains a lithium anode; the cathode; and an electrolyte; wherein at least one of anode, the cathode and the electrolyte, include the solid, ionically conducting polymer material.

27 Claims, 15 Drawing Sheets

Related U.S. Application Data is a continuation-in-part of application No. 13/861,170, filed on Apr. 11, 2013, now Pat. No. 9,819,053.

(60) Provisional application No. 61/973,325, filed on Apr. 1, 2014, provisional application No. 61/911,049, filed on Dec. 3, 2013, provisional application No. 61/622,705, filed on Apr. 11, 2012.

(51) Int. Cl.

| | | |
|---|---|---|
| *H01M 4/60* | (2006.01) | |
| *H01M 4/62* | (2006.01) | |
| *H01M 4/58* | (2010.01) | |
| *H01M 10/052* | (2010.01) | |
| *H01M 10/0565* | (2010.01) | |
| *H01G 11/50* | (2013.01) | |
| *H01G 11/48* | (2013.01) | |
| *H01G 11/06* | (2013.01) | |
| *H01G 11/86* | (2013.01) | |

(52) U.S. Cl.
CPC .............. *H01G 11/86* (2013.01); *H01M 4/38* (2013.01); *H01M 4/58* (2013.01); *H01M 4/602* (2013.01); *H01M 10/052* (2013.01); *H01M 10/0565* (2013.01); *H01M 4/625* (2013.01); *H01M 2300/0082* (2013.01); *Y02E 60/13* (2013.01)

(56) References Cited

U.S. PATENT DOCUMENTS

| | | |
|---|---|---|
| 3,336,279 A | 8/1967 | Scott |
| 3,502,606 A | 3/1970 | Conciatori et al. |
| 4,243,732 A | 1/1981 | Powers et al. |
| 4,465,744 A | 8/1984 | Susman et al. |
| 4,720,910 A | 1/1988 | Rourke et al. |
| 4,804,594 A * | 2/1989 | Jow ...................... H01M 10/05 429/213 |
| 4,925,751 A | 5/1990 | Shackle et al. |
| 5,147,739 A | 9/1992 | Beard |
| 5,160,880 A | 11/1992 | Palanisamy |
| 5,169,494 A | 12/1992 | Hashimoto et al. |
| 5,227,043 A | 7/1993 | Shakushiro et al. |
| 5,270,137 A * | 12/1993 | Kubota .............. B01D 67/0093 429/249 |
| 5,378,560 A | 1/1995 | Tomiyama |
| 5,403,675 A | 4/1995 | Ogata et al. |
| 5,424,151 A | 6/1995 | Koksbang et al. |
| 5,462,566 A | 10/1995 | Skotheim |
| 5,506,073 A | 4/1996 | Angell et al. |
| 5,569,559 A | 10/1996 | Fauvarque |
| 5,582,937 A | 12/1996 | LaFollette |
| 5,599,355 A | 2/1997 | Nagasubramanian et al. |
| 5,620,811 A | 4/1997 | Zhang et al. |
| 5,648,187 A | 7/1997 | Skotheim |
| 5,660,953 A | 8/1997 | Bai et al. |
| 5,688,613 A | 11/1997 | Li et al. |
| 5,713,169 A | 2/1998 | Meier et al. |
| 5,882,621 A | 3/1999 | Doddapaneni et al. |
| 5,888,672 A | 3/1999 | Gustafson et al. |
| 5,917,693 A | 6/1999 | Kono et al. |
| 5,989,742 A | 11/1999 | Cabasso et al. |
| 6,074,773 A | 6/2000 | Wilkinson et al. |
| 6,110,619 A | 8/2000 | Zhang et al. |
| 6,162,563 A | 12/2000 | Miura et al. |
| 6,183,914 B1 | 2/2001 | Yao et al. |
| 6,248,474 B1 | 6/2001 | Nishiyama et al. |
| 6,274,261 B1 | 8/2001 | Tinker et al. |
| 6,274,681 B1 | 8/2001 | Inagaki et al. |
| 6,358,651 B1 | 3/2002 | Chen et al. |
| 6,376,123 B1 | 4/2002 | Chu |
| 6,413,676 B1 | 7/2002 | Munshi |
| 6,451,487 B1 | 9/2002 | Besner et al. |
| 6,455,202 B1 | 9/2002 | Marugan et al. |
| 6,461,724 B1 | 10/2002 | Radovanovic et al. |
| 6,630,271 B1 * | 10/2003 | Arcella ................ C08F 214/22 429/212 |
| 6,645,675 B1 | 11/2003 | Munshi |
| 6,652,440 B1 * | 11/2003 | Kovalev ............... C08G 75/14 525/279 |
| 6,664,006 B1 | 12/2003 | Munshi |
| 6,727,343 B2 | 4/2004 | Morris et al. |
| 7,070,882 B1 | 7/2006 | Ferrando |
| 7,455,935 B2 | 11/2008 | Abe et al. |
| 7,651,647 B1 | 1/2010 | Strange et al. |
| 8,227,105 B1 | 7/2012 | Gerald, II et al. |
| 8,753,594 B1 | 6/2014 | Burba, III et al. |
| 8,877,376 B2 | 11/2014 | Wakizaka et al. |
| 8,906,556 B2 | 12/2014 | Hambitzer |
| 8,945,432 B2 | 2/2015 | Towns et al. |
| 9,742,008 B2 | 8/2017 | Zimmerman et al. |
| 9,819,053 B1 | 11/2017 | Zimmerman |
| 10,553,901 B2 | 2/2020 | Zimmerman et al. |
| 2001/0003863 A1 | 6/2001 | Thibault et al. |
| 2002/0010261 A1 | 1/2002 | Callahan et al. |
| 2002/0048706 A1 | 4/2002 | Mayes et al. |
| 2002/0177043 A1 | 11/2002 | Ndzebet et al. |
| 2003/0013012 A1 | 1/2003 | Ahn et al. |
| 2003/0069343 A1 | 4/2003 | Smith et al. |
| 2003/0138702 A1 | 7/2003 | Gerald, II et al. |
| 2003/0162087 A1 | 8/2003 | Clarke et al. |
| 2003/0209692 A1 | 11/2003 | Farrand et al. |
| 2004/0023116 A1 | 2/2004 | Fujino et al. |
| 2004/0076881 A1 | 4/2004 | Bowden et al. |
| 2004/0157101 A1 | 8/2004 | Smedley |
| 2004/0229118 A1 | 11/2004 | Wensley et al. |
| 2005/0019661 A1 | 1/2005 | Han et al. |
| 2005/0112458 A1 | 5/2005 | Dopp et al. |
| 2005/0112471 A1 | 5/2005 | Chen et al. |
| 2005/0164085 A1 | 7/2005 | Bofinger et al. |
| 2005/0181280 A1 | 8/2005 | Ceder et al. |
| 2005/0244696 A1 | 11/2005 | Kuromatsu et al. |
| 2005/0287441 A1 | 12/2005 | Passerini et al. |
| 2006/0004112 A1 | 1/2006 | Shimoyama et al. |
| 2006/0166085 A1 | 7/2006 | Hennige et al. |
| 2006/0269834 A1 | 11/2006 | West et al. |
| 2007/0015047 A1 | 1/2007 | Hosaka et al. |
| 2007/0020525 A1 | 1/2007 | Kim et al. |
| 2007/0051366 A1 | 3/2007 | Hansmann et al. |
| 2007/0166618 A1 | 7/2007 | Armand et al. |
| 2007/0250036 A1 | 10/2007 | Volk et al. |
| 2008/0066297 A1 | 3/2008 | Lin et al. |
| 2008/0090138 A1 | 4/2008 | Vu et al. |
| 2008/0118826 A1 | 5/2008 | Shimamura et al. |
| 2008/0199755 A1 | 8/2008 | Brotherston et al. |
| 2008/0248356 A1 | 10/2008 | Kimura et al. |
| 2008/0292953 A1 | 11/2008 | Hosaka et al. |
| 2009/0162755 A1 | 6/2009 | Neudecker |
| 2009/0197183 A1 | 8/2009 | Kato |
| 2009/0246636 A1 | 10/2009 | Chiang et al. |
| 2009/0272731 A1 | 11/2009 | Olding et al. |
| 2010/0227224 A1 * | 9/2010 | Eitouni ................ H01M 4/134 429/322 |
| 2011/0020708 A1 | 1/2011 | Fujiki et al. |
| 2011/0027666 A1 | 2/2011 | Burchardt et al. |
| 2011/0070487 A1 | 3/2011 | Padhi et al. |
| 2011/0104511 A1 | 5/2011 | Okumura et al. |
| 2011/0104571 A1 | 5/2011 | Zhamu et al. |
| 2011/0111287 A1 | 5/2011 | Sayre et al. |
| 2011/0204341 A1 | 8/2011 | Brown et al. |
| 2011/0223477 A1 | 9/2011 | Nelson et al. |
| 2011/0223518 A1 | 9/2011 | Hirakimoto |
| 2011/0274983 A1 | 11/2011 | Yontz et al. |
| 2011/0274990 A1 | 11/2011 | Xu |
| 2011/0281158 A1 | 11/2011 | Tazoe |
| 2011/0281159 A1 | 11/2011 | Farmer et al. |
| 2011/0318646 A1 | 12/2011 | Babinec et al. |
| 2012/0094250 A1 | 4/2012 | Lloyd et al. |
| 2012/0107690 A1 | 5/2012 | Wakizaka et al. |
| 2012/0115049 A1 | 5/2012 | Rinzler et al. |
| 2012/0129045 A1 | 5/2012 | Gin et al. |
| 2012/0164526 A1 | 6/2012 | Adamson et al. |

(56) References Cited

U.S. PATENT DOCUMENTS

| | | |
|---|---|---|
| 2012/0171574 A1 | 7/2012 | Zhamu et al. |
| 2012/0189897 A1 | 7/2012 | Wakizaka et al. |
| 2012/0208091 A1 | 8/2012 | Tsai et al. |
| 2012/0231355 A1 | 9/2012 | Lee et al. |
| 2012/0321970 A1 | 12/2012 | Friesen et al. |
| 2013/0084507 A1 | 4/2013 | Johnson |
| 2013/0136981 A1 | 5/2013 | Peuchert et al. |
| 2013/0149436 A1 | 6/2013 | Hsieh et al. |
| 2013/0189589 A1 | 7/2013 | Hashaikeh et al. |
| 2013/0216936 A1 | 8/2013 | Fuchs et al. |
| 2014/0004431 A1 | 1/2014 | Yamaguchi et al. |
| 2014/0057153 A1 | 2/2014 | Visco et al. |
| 2014/0059820 A1 | 3/2014 | Wright et al. |
| 2014/0079995 A1 | 3/2014 | Wakada |
| 2014/0088207 A1 | 3/2014 | Elabd et al. |
| 2014/0141336 A1 | 5/2014 | Morin |
| 2014/0227614 A1 | 8/2014 | Lee et al. |
| 2014/0349160 A1 | 11/2014 | Kato et al. |
| 2014/0377621 A1 | 12/2014 | Hanyu et al. |
| 2015/0064574 A1 | 3/2015 | He et al. |
| 2015/0064575 A1 | 3/2015 | He et al. |
| 2015/0146452 A1 | 5/2015 | Kim et al. |
| 2015/0155559 A1 | 6/2015 | Zimmerman et al. |
| 2015/0180037 A1* | 6/2015 | Gronwald ......... H01M 10/0525 429/209 |
| 2015/0364791 A1 | 12/2015 | Vu et al. |
| 2016/0028133 A1 | 1/2016 | Miles |
| 2016/0118685 A1 | 4/2016 | Zhang et al. |
| 2016/0233461 A1 | 8/2016 | Young et al. |
| 2016/0233510 A1 | 8/2016 | Onodera et al. |
| 2016/0365553 A1 | 12/2016 | Kountz et al. |
| 2017/0005356 A1 | 1/2017 | Zimmerman |
| 2017/0018781 A1 | 1/2017 | Zimmerman |
| 2017/0092958 A1 | 3/2017 | Zimmerman et al. |
| 2017/0338492 A1 | 11/2017 | Zimmerman et al. |
| 2018/0006308 A1 | 1/2018 | Zimmerman et al. |
| 2018/0151910 A1 | 5/2018 | Zimmerman et al. |
| 2018/0151914 A1 | 5/2018 | Zimmerman et al. |
| 2018/0175372 A1 | 6/2018 | Zimmerman et al. |
| 2018/0198124 A1 | 7/2018 | Zimmerman et al. |
| 2018/0212232 A1 | 7/2018 | Zimmerman et al. |
| 2018/0219210 A1 | 8/2018 | Kim |
| 2019/0067764 A1 | 2/2019 | Zimmerman et al. |

FOREIGN PATENT DOCUMENTS

| | | |
|---|---|---|
| CN | 1354529 A | 6/2002 |
| CN | 1354529 C | 6/2002 |
| CN | 1457518 A | 11/2003 |
| CN | 1457518 C | 11/2003 |
| CN | 1592937 A | 3/2005 |
| CN | 1965436 A | 5/2007 |
| CN | 101290985 A | 10/2008 |
| JP | 59-157151 A | 9/1984 |
| JP | 04-267055 A | 9/1992 |
| JP | 9-219197 A | 8/1997 |
| JP | 2002/352799 A | 12/2002 |
| JP | 2002-358959 | 12/2002 |
| JP | 2003/242964 A | 8/2003 |
| JP | 2005/535076 A | 11/2005 |
| JP | 2006/049122 A | 2/2006 |
| JP | 2006-210089 A | 8/2006 |
| JP | 2006-520519 A | 9/2006 |
| JP | 2007-080642 A1 | 3/2007 |
| JP | 2010/509719 A | 3/2010 |
| JP | 2011-28976 A | 2/2011 |
| JP | 2012/517519 B2 | 8/2012 |
| JP | 2014-067638 A | 4/2014 |
| JP | 2014-112560 A | 6/2014 |
| JP | 2015-529945 A | 10/2015 |
| KR | 10-2008-0023294 A | 3/2008 |
| KR | 10-2011-0106342 A | 9/2011 |
| KR | 10-2012-0117853 A | 10/2012 |
| SG | 11201604216 | 6/2016 |
| WO | 1998/42037 A1 | 9/1998 |
| WO | 1999/33127 A1 | 7/1999 |
| WO | 2001/017051 | 3/2001 |
| WO | 2001/026175 A1 | 4/2001 |
| WO | 2004/027909 A1 | 4/2004 |
| WO | 2006/019064 A2 | 2/2006 |
| WO | 2010/061452 A1 | 6/2010 |
| WO | 2011/146670 A1 | 11/2011 |
| WO | 2014/020349 A1 | 2/2014 |
| WO | 2015/084940 A1 | 6/2015 |
| WO | 2015084940 | 6/2015 |
| WO | 2015/153729 A1 | 10/2015 |
| WO | 2019/065066 A1 | 4/2019 |

OTHER PUBLICATIONS

Chiu, H.-T. et al., "Intermolecular Interactions and Aggregated Structures in Poly(p-phenylene sulfide) Doped with Some Organic Acceptors," Kobunshi Ronbunshu, vol. 41, No. 9, pp. 525-529, 1984. English abstract only, p. 529.

Wu, Y., ed., "Lithium Ion Battery Application and Practice," Chapter 11: Solid Electrolyte. Chinese; cited in Third Office Action for CN 2015/80018411.6. Art is summarized in the attached foreign Office Action citing the art, and a translation of the summary with a copy of the translator signature is attached.

Barron et al. The Effect of Temperature on Conductivity Measurement. TSP, vol. 3. 2007. [retrieved on Aug. 9, 2016]. Retrieved from the Internet: <URL:http://www.reagecon.com/pdf/technicalpapers/Effect_of_Temperature_TSP-07_Issue3.pdf>. entire document.

Candlin, J. "Polymers" within "The Chemical Industry: Second Edition." Edited by Alan Heaton. 1994. Spring Science+Business Media Dordrecht, pp. 116-121.

Dang, T.D. et al., "Ionic Conductivity of Conjugated Water-Soluble Rigid-Rod Polymers," Journal of Polymer Science: Part B: Polymer Physics, vol. 31 pp. 1941-1950, 1993.

Definition of Dopant. http://www.merriam-webster.com/dictionary/dopant. Downloaded Feb. 4, 2019.

Edman, L. et al., "Transport properties of the Solid Polymer Electrolyte System P(EO)nLiTFSI," Journal of Physical Chemistry B, 2000; vol. 104, No. 15, pp. 3476-3480.

Ferrando, W.A., "Development of a Novel Composite Aluminum Anode," Journal of Power Sources, vol. 130, Issues 102, pp. 309-314, May 2004. Abstract only.

Florjanczyk, Z. et al., "Polymer-in-Salt Electrolytes Based on Acrylonitrile/Butyl Acrylate Copolymers and Lithium Salts," Journal of Physical Chemistry B, 2004, vol. 108, pp. 14907-14914.

Kösters, J. et al., "Ion Transport Effects in a Solid Polymer Electrolyte Due to Salt Substitution and Addition Using an Ionic Liquid," Journal of Physical Chemistry B, 2013, vol. 117, pp. 2527-2534.

Lefrou, C. et al., "Electrochemistry: The Basics, With Examples." Springer-Verlag Berlin Heidelberg, pp. 22-25, 2012.

Lesch, V. et al., "A Combined theoretical and experimental study of the Influence of Different anion ratios on lithium ion dynamics in ionic liquids," Journal of Physical Chemistry B, 2014, vol. 118, No. 26, pp. 7367-7375.

Liew, C.-W. et al., "Characterization of ionic liquid added poly(vinyl alcohol)-based proton conducting polymer electrolytes and electrochemical studies on the supercapacitors," International Journal of Hydrogen Energy, vol. 40, pp. 852-862, 2015.

Miyatake, K. et al., "Synthesis of poly(phenylene sulfide sulfonic acid) via poly(sulfoniumcation) as a thermostable proton-conducting polymer," Macromolecules, vol. 29, pp. 6969-6971, 1996.

OPI Online Courses, "Insulator, Semiconductor Conductor," (online), Jul. 1, 2012.

Polyphenylene Sulfide Information. DIC Corporation. http://www.dic-global.com/us/en/products/pps/about.html. Downloaded on Jun. 8, 2016.

Polystyrene, Wikipedia. https://en.wikipedia.org/wiki/Polystyrene. Downloaded Feb. 4, 2019.

(56) References Cited

OTHER PUBLICATIONS

Sandor, R.B., "PBI (Polybenzimidazole): Synthesis, Properties and Applications," High Performance Polymers, vol. 2, No. 1, pp. 25-37, 1990.
Sannigrahi, A. et al., "Tuning the Molecular Properties of Polybenzimidazole by Copolymerization," Journal of Physical Chemistry B, vol. 111, pp. 12124-12132, 2007.
Santhosh, P. et al., "Preparation and properties of new cross-linked polyurethane acrylate electrolytes for lithium batteries," Journal of Power Sources 160, pp. 609-620, 2006.
Sigma Aldritch Materials Science Products. Pi-conjugated Polymers. Jun. 5, 2014 (Jun. 5, 2014) [retrieved on Aug. 9, 2016]. Retrieved from the Internet: <URL: http://www.sigmaaldrich.com/materials-science/material-science-products.html? TablePage=111775702>. entire document.
Solvay. Ryton PPS. Feb. 7, 2015 (Feb. 7, 2015) [retrieved on Aug. 9, 2016]. Retrieved from the Internet: <URL: http://www.solvay.com/en/markets-and-products/featured-products/Ryton-PPS.htmlf>. entire document.
Teng, H., "Overview of the development of the fluoropolymer Industry," Applied Sciences, 2012, vol. 2, pp. 496-512.
Tokito et al. Electrical Conductivity and Optical Properties of Poly(p-phenylene sulfide) doped with Some Organic Acceptors. Polymer Journal, vol. 17, No. 8, pp. 959-968.1985. Retrieved from the Internet<URL:HTTP://www.nature.com/pj/journal/v17/n8/pdf/pj 1985103a.pdf.> entire document.
Wikipedia entry of Electrolyte. https://en.wikipedia.org/wiki/Electrolyte. Downloaded Feb. 1, 2019.
Yang, Y. et al., "Effect of Lithium Iodide Addition on Poly(ethylene oxide)-Poly(vinylidene fluoride) Polymer-Blend Electrolyte for dye-Sensitized Nanocrystalline Solar Cell," Journal of Physical Chemistry B, vol. 112, pp. 6594-6602, 2008.
Supplementary European Search Report, dated Apr. 5, 2017, from related European Patent Application No. 14868257, filed on Dec. 3, 2014.
Supplementary European Search Report, dated Oct. 9, 2018, from related European Patent Application No. 16804233.1, filed on May 31, 2016.
Extended European Search Report, dated Oct. 8, 2018, from related European Patent Application No. 16804487.3, filed on Jan. 4, 2018.
Extended European Search Report, dated Oct. 5, 2018, from related European Patent Application No. 16804636.5, filed on Jan. 4, 2018.
Extended European Search Report, dated Dec. 13, 2018, from related European Patent Application No. 16808115.6, filed on Jun. 7, 2016.
Supplementary European Search Report, dated Oct. 15, 2018, from related European Patent Application No. 16808165.1, filed on Jun. 8, 2016.
International Search Report and the Written Opinion of the International Searching Authority, dated Apr. 5, 2018 from related PCT/US2018/015146 filed on Jan. 25, 2018.
Diez-Pascual, A., et al. "High-Performance Aminated Poly(phenylene sulfide)/ZnO Nanocomposites for Medical Applications." ACS Applied Materials & Interfaces 6, No. 13 (Jun. 13, 2014), 10132-10145.
Wu, Y., ed., "Chapter 11: Solid Electrolyte." In Lithium Ion Battery Application and Practice, Chemical Industry Press, China: Chemical Industry Press (2011). Cited in Third Office Action for CN 2015/80018411.6. Art is summarized in the attached foreign Office Action citing the art, and a translation of the summary with a copy of the translator signature is attached.
Lefkowitz et al., "Influence of pH on the Reductive Transformation of Birnessite by Aqueous Mn(II)," Environmental Science & Technology, vol. 47, pp. 10364-10371, 2013.
Persson et al., "Materials Data on MnO2 (SG:164) by Materials Project," database entry #mp-25558, Nov. 2014 [retrieved via <https://doi.org/10.17188/1200755>].
Wang et al., "The effects of Mn loading on the structure and ozone decomposition activity of MnOx supported on activated carbon," Chinese Journal of Catalysis, vol. 35, No. 3, pp. 335-341, Mar. 13, 2014.
Yu et al., "Solution-combustion synthesis of epsilo-MnO2 for supercapacitors," Materials Letters, vol. 64, pp. 61-64, Oct. 9, 2009.
International Search Report and Written Opinion, dated Oct. 2, 2019 for related PCT/US2019/038190, filed on Jun. 20, 2019.
Fedelich, N., Application Handbook Thermal Analysis of Polymers Selected Applications Thermal Analysis. Retrieved from the Internet: https://www.mt.com/dam/LabDiv/guides-glen/ta-polymer/TA_Polymers_ Selected_Apps_EN.pdf.
Imrie, C.T. et al., "Ion Transport in Glassy Polymer Electrolytes," Journal of Physical Chemistry B, vol. 103, pp. 4132-4138, 1999.
Lu, Y. et al., "Platinum-Gold Nanoparticles: A Highly Active Bifunctional Electrocatalyst for Rechargeable Lithium-Air Batteries," Journal of the American Chemical Society vol. 132, No. 35, pp. 12170-12171, 2010.
Taib, N. U. et al., "Plastic crystal-solid biopolymer electrolytes for rechargeable lithium batteries," Journal of Membrane Science, vol. 468, pp. 149-154, 2014.
Moharram, M.A. et al., "Electrical Conductivity of Poly(acrylic acid)—Polyacrylamide Complexes," Journal of Applied Polymer Science, vol. 68, pp. 2049-2055, John Wiley & Sons, Inc. (1998).
Wu, G.M. et al., "Alkaline Zn-air and Al-air cells based on novel solid PVA/PAA polymer electrolyte membranes," Journal of Membrane Science, 280, pp. 802-808, Elsevier B.V. (2006; published online Apr. 4, 2006).
Zhang, Z. et al., "All-solid-state Al-air batteries with polymer alkaline gel electrolyte," Journal of Power Sources., 251, pp. 470-475, Elsevier B.V (2014; available online Nov. 20, 2013).
Brady, D.G. "The crystallinity of poly(phenylene sulfide) and its effect on polymer properties." Journal of Applied Polymer Science, 1976, 20, 2541-2551.
Diez-Pascual, A.M. et al., "Inorganic nanoparticle-modified poly(phenylene sulphide)/carbon fiber laminates: thermomechanical behavious." Materials, 2013, 6, 3171-3193.
Nohara, L.B. et al., "Study of crystallization behavior of poly(phenylene sulfide)." Polimeros: Ciencia e tecnologia, 2006, 16, 104-110.
Zak, A.K. et al., "Synthesis and characterization of a narrow size distribution of zinc oxide nanoparticles." International Journal of Nanomedicine, 2011, 6, 1399-1403.
Japanese Office Action for related Japanese Application No. JP2016/560448, dated Mar. 19, 2019.
Ahmad et al., Structural studies and ionic conductivity of lithium iodide-lithium tungstate solid electrolytes. Ionics, 2002, 8, 433-438 (2002).
Celazole® T-Series: Injection Molding Thermoplastic Polymers. Brochure of PBI Performance Products, Inc., 2013.
Gal'Perin et al., Determination of the crystallinity of polyvinylidene fluoride. Polymer Science: USSR 1970, 12, 2133-2139 (1970).
Lee et al., PVDF-based nanocomposite solid polymer electrolytes; the effect of affinity between PVDF and filler on ionic conductivity. Composite Interfaces 2009, 16, 347-358.
Lithium Iodide Information. ChemBook. http://www.chemicalbook.com/ChemicalProductProperty_EN_cb8688141.htm. As viewed on Apr. 25, 2017.
PBI Information. Polymers: A Property Database 2017, CRC Press, Taylor & Francis Group (2017).
Polyacrylonitrile Information. ChemicalBook. http://www.chemicalbook.com/ChemicalProductProperty_USCB9199592.aspx. As viewed on Jan. 18, 2018.
Polymer Density Table. ScientificPolymer. http://scientificpolymer.com/density-of-polymers-by-density/. As viewed on Mar. 11, 2015.
Polyvinylidenefluoride (PVDF) Information, Goodfellow, http://www.goodfellow.com/E/Polyvinylidenefluoride.html. As viewed on Jan. 18, 2018.
Spry, R.J. et al., Anisotropic Ionic Conductivity of Lithium-Doped Sulfonated PBI, Journal of Polymer Science: Part B: Polymer Physics, 35, 2925-2933 (1997).
Suib, S.L., New and future developments in catalysis: Batteries, Hydrogen Storage and Fuel Cells. Elsevier B.V. Jul. 29, 2013, pp. 1-16.
International Search Report and the Written Opinion of the International Search Authority, dated Apr. 5, 2017, from related PCT/US2014/068338, filed on Dec. 3, 2014.

(56) References Cited

OTHER PUBLICATIONS

International Search Report and the Written Opinion of the International Search Authority, dated Oct. 26, 2016, from related PCT/US2016/035040, filed on May 31, 2016.
Hayashi, A. et al., "Superionic glass-ceramic electrolytes for room-temperature rechargeable sodium batteries," Nature Communications, 3:856 (May 22, 2012) 1-5.
International Application No. PCT/US2019/063562 International Search Report mailed on Mar. 25, 2020.
Translated Text of the First Office Action, dated Aug. 7, 2018, from counterpart national stage Chinese Patent Application No. 2015/80018411.6.
Ye et al., Dictionary of Weapon Industry Science and Technology Exploder, edited by Ye Ying, National Defense Industry Press, published in Dec. 1991, pp. 13-134.
Liu et al., "Effect of Preparation of Methods on Crystallization Behavior and Tensile Strength of Poly(vinylidene fluoride) Membranes," Membranes, Nov. 21, 2013, 3, 389-405.

\* cited by examiner

FIG. 1
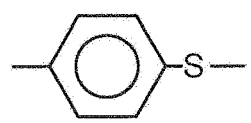
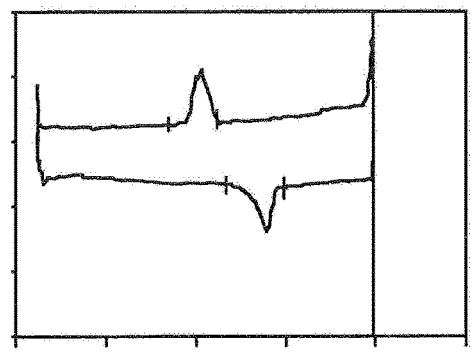
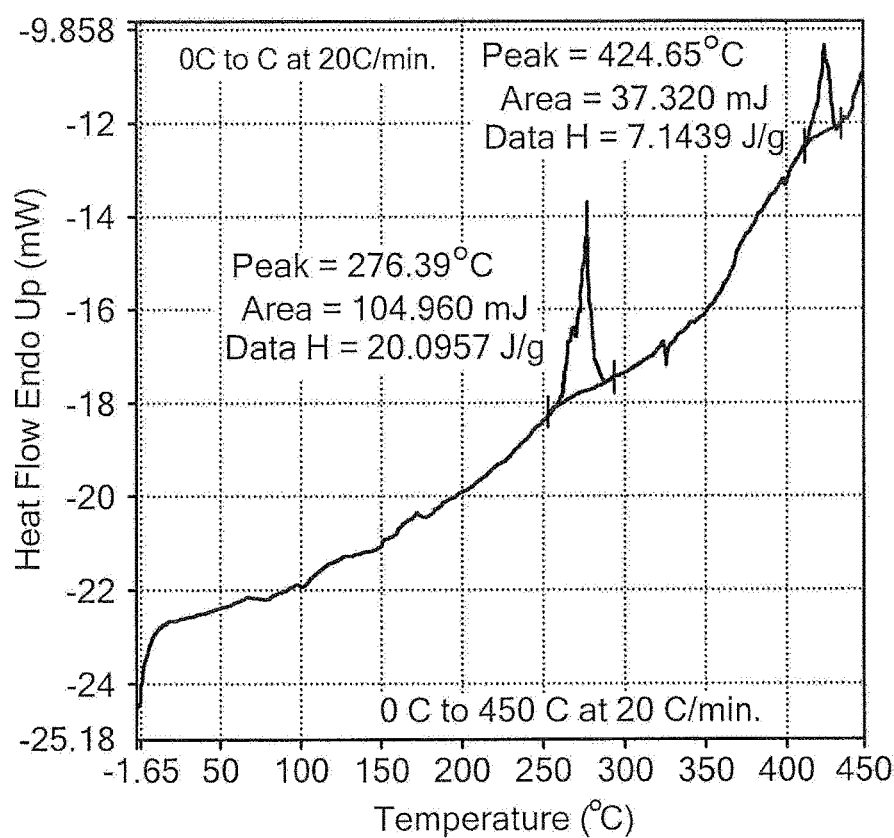
Dynamic Scanning Calorimetry Curve of Semicrystalline Polymer
FIG. 2

| Compounds | A | B | C | D |
|---|---|---|---|---|
| | | | | |
| Base Resin | | | | |
| Phillips-Chevron Ryton QC160N PPS | 80 wt% | 50 wt% | 67 wt% | 50 wt% |
| | | | | |
| Ion Source Fillers | | | | |
| Zinc Oxide, 20nm spheres | 20 wt% | 50 wt% | | |
| Lithium Oxide, milled to <2 micron | | | 33 wt% | 50 wt% |

*FIG. 3*

Table 1
Exemplary formulations investigated.

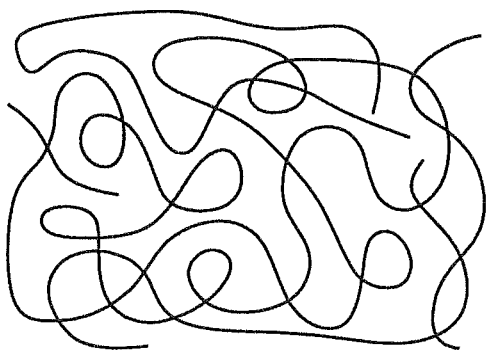 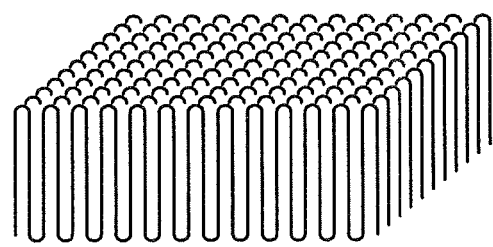

They can fold, and they can stack. A stack of polymer chains folded back on themselves like this is called a lamella.

Amorphous and Crystalline Polymers

*FIG. 4*

*FIG. 5* 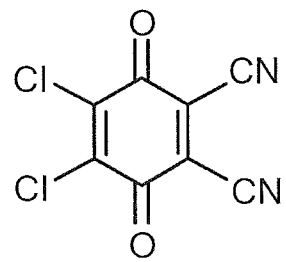

2,3-dicyano-5,6-dichlorodicyanoquinone

Ionic Film Passes UL-VO Flammability Test

Flame Applied to Ionic Film    Flame Self Extinguished in 2 sec.

UL94 Flammability test

Cyclic Voltammetry of Ionically Conductive Polymer versus Lithium Metal

Ionically conductive electrolyte and electrode components

Solid State Battery-Electrode and electrolyte bonded together

Flexible Form of Battery

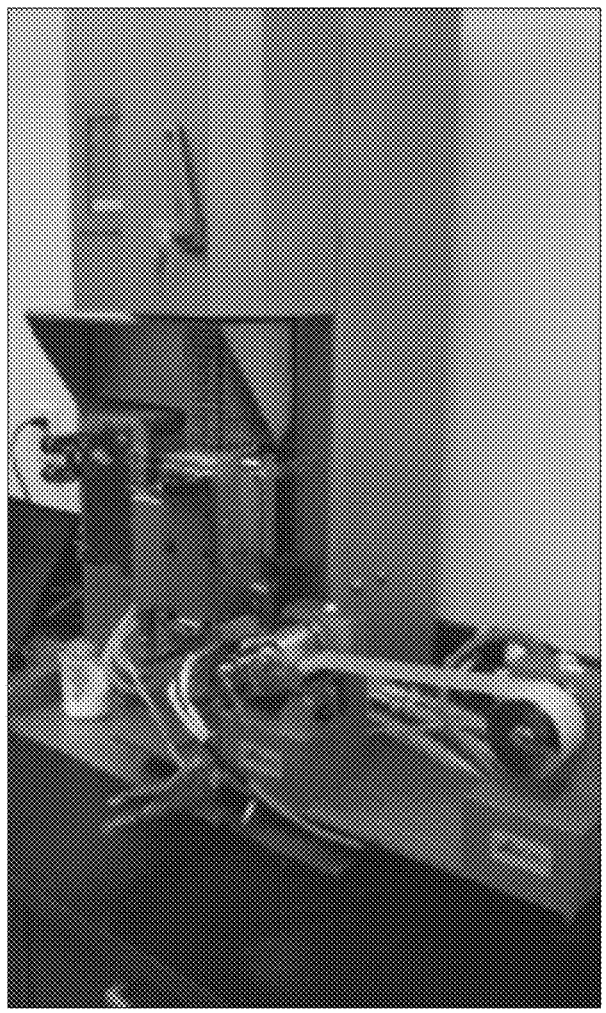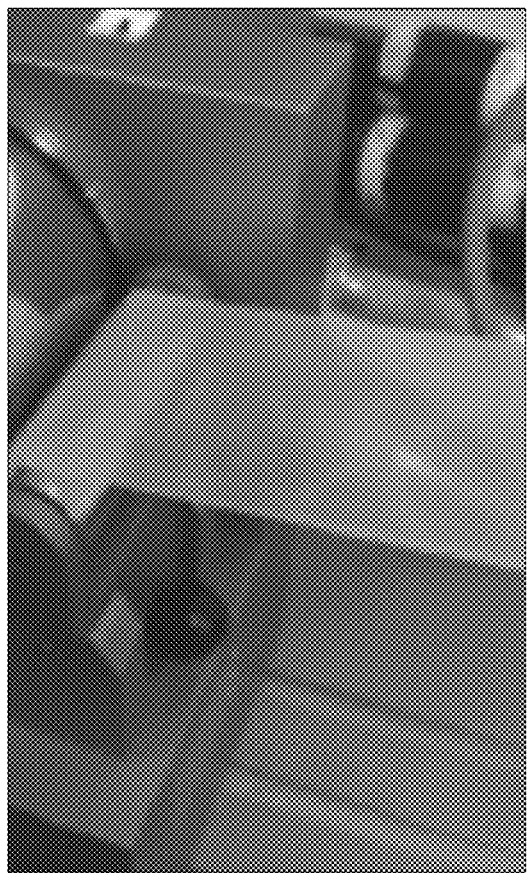
Film Thickness as low as 0.0003" have been achieved
Extrusion Process
*FIG. 15*

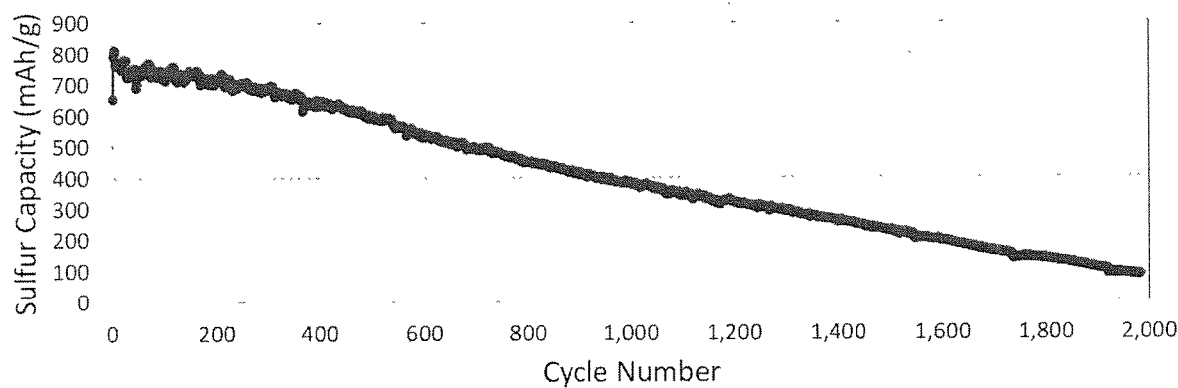
FIG. 21 Discharge capacity curve plotted as a function of cycle number for high capacity Li/ polymer-sulfur cell of the present invention.
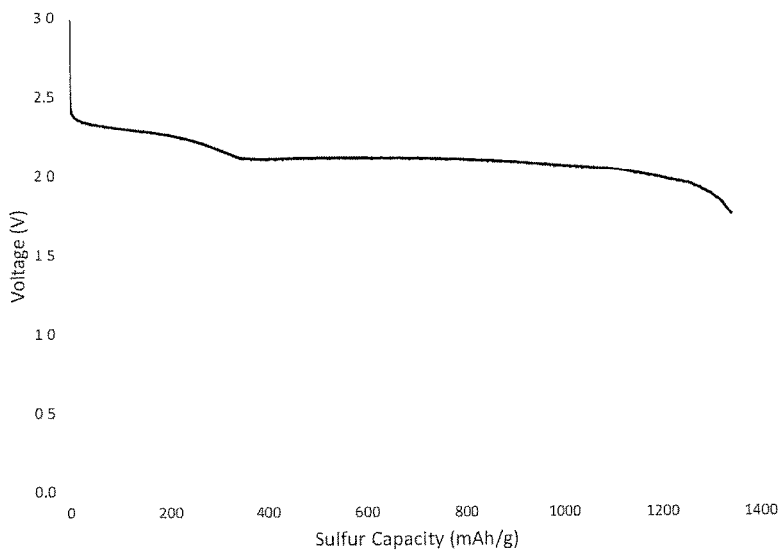
FIG. 22 First discharge voltage curve for Li/ polymer-sulfur cell with a slurry-cast cathode of the present invention assembled into a pouch battery.

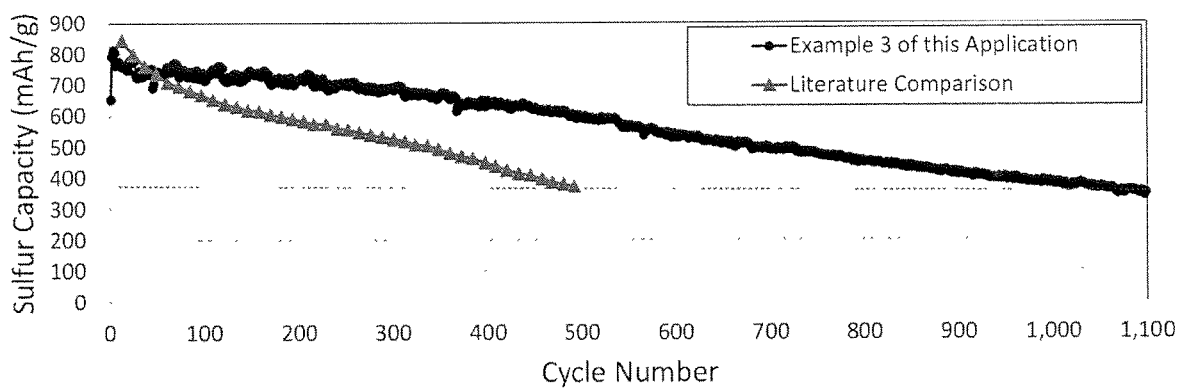
FIG. 25 Comparison of cycle life curves for literature example Li/Sulfur (Red) with Li/solid ionically conductive polymer-sulfur of present invention (Black).

HIGH CAPACITY POLYMER CATHODE AND HIGH ENERGY DENSITY RECHARGEABLE CELL COMPRISING THE CATHODE

STATEMENT REGARDING FEDERALLY SPONSORED RESEARCH OR DEVELOPMENT

N/A

BACKGROUND OF THE INVENTION

Batteries have become increasingly important in modern society, both in powering a multitude of portable electronic devices, as well as being key components in new green technologies. These new technologies offer the promise of removing the dependence on current energy sources such as coal, petroleum products, and natural gas which contribute to the production of by-product green-house gases. Furthermore, the ability to store energy in both stationary and mobile applications is critical to the success of new energy sources, and is likely to sharply increase the demand for all sizes of advanced batteries. Especially for batteries for large applications, a low base cost of the battery will be key to the introduction and overall success of these applications.

Conventional batteries have limitations, however. For example, lithium ion and other batteries generally employ a liquid electrolyte which is hazardous to humans and to the environment and which can be subject to fire or explosion. Liquid electrolyte batteries are hermetically sealed in a steel or other strong packaging material which adds to the weight and bulk of the packaged battery. Conventional liquid electrolyte suffers from the build-up of a solid interface layer at the electrode/electrolyte interface which causes eventual failure of the battery. Conventional lithium ion batteries also exhibit slow charge times and suffer from a limited number of recharges since the chemical reaction within the battery reaches completion and limits the re-chargeability because of corrosion and dendrite formation. The liquid electrolyte also limits the maximum energy density which starts to break down at about 4.2 volts while often 4.8 volts and higher are required in the new industry applications. Conventional lithium ion batteries require a liquid electrolyte separator to allow ion flow but block electron flow, a vent to relieve pressure in the housing, and in addition, safety circuitry to minimize potentially dangerous over-currents and over-temperatures.

While the battery technology for many advanced applications is Lithium Ion (Li-ion), increased demands for higher energy density, both in terms of volumetric (Wh/L) for portable devices, and gravimetric (Wh/kg) for electric vehicles and other large applications have shown the necessity for accessing technologies well beyond the current capabilities of Li-ion cells. One such promising technology is Li/sulfur batteries. A sulfur based cathode is enticing because of the high theoretical energy density (1672 mAh/g) which is ~10× better than the current Li-ion metal oxide cathode active materials. Sulfur is also exciting because it is a very abundant, low cost, environmentally friendly material, unlike many current Li-ion battery materials, such as $LiCoO_2$.

Recently, there has been a great amount of activity in Li/sulfur battery research, with advances in the capacity and cycle life of rechargeable Li/sulfur cells. Activity has included modifications to the cathode, anode, electrolyte and separator, all with the goal of reducing the polysulfide shuttle and thereby improving cell performance. Applications of this research to sulfur cathodes has focused in two main areas: 1) the use of engineered materials to surround and contain the sulfur and soluble lithiated products, for example see: U.S. Patent Application 2013/0065128, and 2) the use of conductive polymers which react with sulfur to produce a "sulfurized" composite cathode material. Examples of "sulfurized-polymer" include reaction products from high temperature exposure of sulfur with polyacrylonitrile (PAN) [see: Jeddi, K., et. al. *J. Power Sources* 2014, 245, 656-662 and Li, L., et. al. *J. Power Sources* 2014, 252, 107-112]. Other conductive polymer systems used in sulfur cathodes include polyvinylpyrrolidone (PVP) [see: Zheng, G., et. al. *Nano Lett.* 2013, 13, 1265-1270] and polypyrrole (PPY) [see: Ma, G., et. al. *J. Power Sources* 2014, 254, 353-359]. While these methods have met with various degrees of success in limiting the polysulfide shuttle mechanism, they all rely on the use of expensive materials which are not well suited to large scale manufacturing.

BRIEF SUMMARY OF THE INVENTION

A solid, ionically conducting polymer material is provided having very high ionic diffusivity and conductivity at both room temperature and over a wide temperature range. The solid ionic polymer material is useful as a solid electrolyte for batteries and is also is useful as a component to make battery electrodes. The material is not limited to battery applications but is more broadly applicable for other purposes such as alkaline fuel cells, supercapacitors, electrochromic devices, sensors and the like. The polymer material is non-flammable and self-extinguishes, which is especially attractive for applications which otherwise might be flammable. In addition the material is mechanically strong and can be manufactured using high volume polymer processing techniques and equipment which themselves are known in the art.

The solid, ionically conducting polymer material includes a base polymer, a dopant and at least one compound including an ion source. The dopant includes an electron donor, an electron acceptor or an oxidant. In one embodiment, the base polymer can be a polyphenylene sulfide, a polyether ether ketone also known as PEEK, or a liquid crystal polymer. In this embodiment, the dopant is an electron acceptor such as, for non-limiting examples, 2,3, dicloro-5,6-dicyano-1,4-benzoquinone, TCNE, sulfur trioxide or chloranil. Other dopants acting as electron acceptors or containing functional groups capable to accept electrons can be employed. The compound including an ion source includes compounds containing ions or materials chemically convertible to compounds containing a desired ion including, but not limited to, hydroxides, oxides, salts or mixtures thereof, and more specifically $Li_2O$, $Na_2O$, $MgO$, $CaO$, $ZnO$, $LiOH$, $KOH$, $NaOH$, $CaCl2$, $AlCl3$, $MgCl2$, LiTFSI (lithium bis-trifluoromethanesulfonimide), LiBOB (Lithium bis(oxalate)borate) or a mixture of the preceding two components.

The solid ionically conducting polymer material exhibits carbon 13 NMR (detection at 500 MHz) chemical shift peaks at about 172.5 ppm, 143.6 ppm, 127.7 ppm, and 115.3 ppm. A similar carbon 13 NMR scan of the electron acceptor shows chemical shift peaks at about 195 ppm, and 107.6 ppm in addition to the chemical shift peaks at about 172.5 ppm, 143.6 ppm, 127.7 ppm, and 115.3 ppm. In other words, the reaction between the base polymer and the electron acceptor appears to eliminate the chemical shift peaks at about 195 ppm, and 107.6 ppm. In addition, the $^{13}C$ NMR spectrum of the solid ionically conducting polymer movement in the main peak (dominated by the aromatic carbon) in going from the base polymer to the solid ionically conducting polymer. The chemical shift of the dominant peak in the solid ionically conducting polymer is greater than the chemical shift of the dominant peak in the base polymer.

The solid ionically conductive material has crystallinity index of at least or greater than about 30%, and can include the ion source is in a range of 10 wt. % to 60 wt. %. The dopant molar ratio is preferably in the range of about 1-16 relative the base polymer. Further the material has an ionic conductivity of at least $1 \times 10^{-4}$ S/cm at room temperature of between 20° C. to 26° C., a tensile strength in the range of 5-100 MPa, a Modulus of Elasticity in the range of 0.5-3.0 GPa, and Elongation in the range of 0.5-30%.

In one embodiment of said battery, the battery comprises an anode; a cathode; and wherein at least one of the anode, and the cathode comprise a solid, ionically conducting polymer material. The battery can be rechargeable or primary. The battery further comprises an electrolyte, and the electrolyte can comprise the solid, ionically conducting polymer material in whole or in part. The battery can alternatively or additionally further comprise an electrolyte.

The solid, ionically conducting polymer material is formed from a reactant product comprising a base polymer, an electron acceptor, and a compound including a source of ions. The solid, ionically conducting polymer material can be used as an electrolyte in either the anode or cathode. If used in a battery the cathode of said battery can comprise an active material selected from the group comprising ferrate, iron oxide, cuprous oxide, iodate, cupric oxide, mercuric oxide, cobaltic oxide, manganese oxide, lead dioxide, silver oxide, oxygen, nickel oxyhydroxide, nickel dioxide, silver peroxide, permanganate, bromate, silver vanadium oxide, carbon monofluoride, iron disulfide, iodine, vanadium oxide, copper sulfide, sulfur or carbon and combinations thereof. The anode of said battery can comprise an active material selected from the group comprising lithium, magnesium, aluminum, zinc, chromium, iron, nickel, tin, lead, hydrogen, copper, silver, palladium, mercury, platinum or gold, and combinations thereof, and alloyed materials thereof.

The battery can alternatively further comprise an electrically conductive additive and/or a functional additive in either the anode or cathode. The electrically conductive additive can be selected from the group comprising a carbon black, a natural graphite, a synthetic graphite, a graphene, a conductive polymer, a metal particle, and a combination of at least two of the preceding components.

The battery electrodes (anode or cathode) can composite structure which can be formed by a process such as injection molding, tube extrusion and compression molding. In a preferred embodiment, a cathode electrode is made including sulfur as the active material, which also includes an ionically conductive polymer. Sulfur as used herein is intended to mean any source of electroactive sulfur such as elemental sulfur, polymeric sulfur, pyrite and other materials that can act to supply sulfur to the electrochemical reaction of the cathode.

The ionically conductive polymer has an ionic conductivity of greater than $1 \times 10^{-4}$ S/cm at room temperature, has Lithium cation diffusivity greater than $1 \times 10^{-11}$ meters squared per second at room temperature and is electrically insulative.

The cathode can further include electrically conductive fillers in order to add electrical conductivity, and the solid, ionically conductive polymer material can encapsulate at least one particle of the active material or other components of the cathode.

The solid, ionically conducting polymer material is formed from a reactant product of a base polymer, an electron acceptor, and a compound including a source of ions. The base polymer is selected from a group comprising conjugated polymers, polyphenylene sulfide, liquid crystal polymer, a polyether ether ketone (PEEK) or a semicrystalline polymer with a crystallinity index of greater than 30%, and combinations thereof, and can be is oxidatively doped in the presence of Li+ cations. The electron acceptor is selected from a group comprising Dichloro Dicyano Quinone ($C_8Cl_2N_2O_2$), TCNE ($C_6N_6$), Sulfur Trioxide ($SO_3$) or chloranil and combinations thereof. The compound including an ion source is preferably LiOH, $L_2O$ or a mixture of the two.

The cathode including sulfur as the active material, and an ionically conductive polymer is preferably incorporated into an electrochemical cell which further includes an anode. The anode active material is preferably lithium but can be alternatively selected from a group comprising Lithium, Tin, Silicon, graphite, or any alloy or mixture thereof.

The demonstrated voltage of the electrochemical cell is greater than 1.0 volts, and the the cathode specific capacity is greater than 500 mAh/g, preferably the cathode specific capacity is greater than 1000 mAh/g, and most preferably the cathode specific capacity is greater than 1500 mAh/g, while demonstrating rechargeable behavior over two thousand cycles.

The solid, ionically conductive polymer material can also be useful as a separator film, as it is electrically non-conductive, and ionically conductive. Therefore the solid, ionically conductive polymer material cast or otherwise rendered as a film can be used as a separator positioned between an anode and cathode. In addition, the solid, ionically conductive polymer material can be coated onto an electrode to function as a separator or alternatively to isolate the electrode or an electrode component from another battery component such as an aqueous electrolyte. The solid, ionically conductive polymer material enables ionic communication between such an isolated component despite it being physically separated, and electrically segmented from the rest of the battery component. The material can also comprise an aggregated or cast agglomeration of small particles of the solid, ionically conductive polymer material. Such an aggregation can take any shape but include an engineered porosity while possessing an engineered surface area. Fillers, such as hydrophobic materials can be mixed in the material to provide desirable physical properties such as low effective aqueous porosity. Thus the solid, ionically conductive polymer material can include a low or very high surface area, and or a low or very high porosity. Shapes such as an annulus and other moldable shapes can be engineering with desired physical properties with the ionic conductivity of the solid, ionically conductive polymer material are enabled by the invention.

BRIEF DESCRIPTION OF THE SEVERAL VIEWS OF THE DRAWINGS

FIG. 1 exemplarily shows a resulting formula for the crystalline polymer of the present invention.

FIG. 2 exemplarily illustrates a dynamic scanning calorimeter curve of a semicrystalline polymer.

FIG. 3 exemplarily illustrates formulations which were investigated for use with the invention.

FIG. 4 shows a schematic illustration of amorphous and crystalline polymers.

FIG. 5 exemplarily illustrates a chemical diagram of 2,3-dicyano-5,6-dichlorodicyanoquinone (DDQ) as a typical electron acceptor dopant for use in the invention.

FIG. 15 exemplarily illustrates the extrusion process according to the invention.

FIG. 21 exemplarily illustrates the discharge capacity curve as a function of cycle number for the lithium-sulfur cell of the present invention.

FIG. 22 exemplarily illustrates the first discharge voltage curve for the lithium-sulfur cell of the present invention with a slurry cast cathode.

FIG. 25 shows the cycle life curves for a literature example Li-Sulfur battery with the Li-solid ionically conductive polymer-sulfur battery of the present invention.

DETAILED DESCRIPTION OF THE INVENTION

Figure 6:
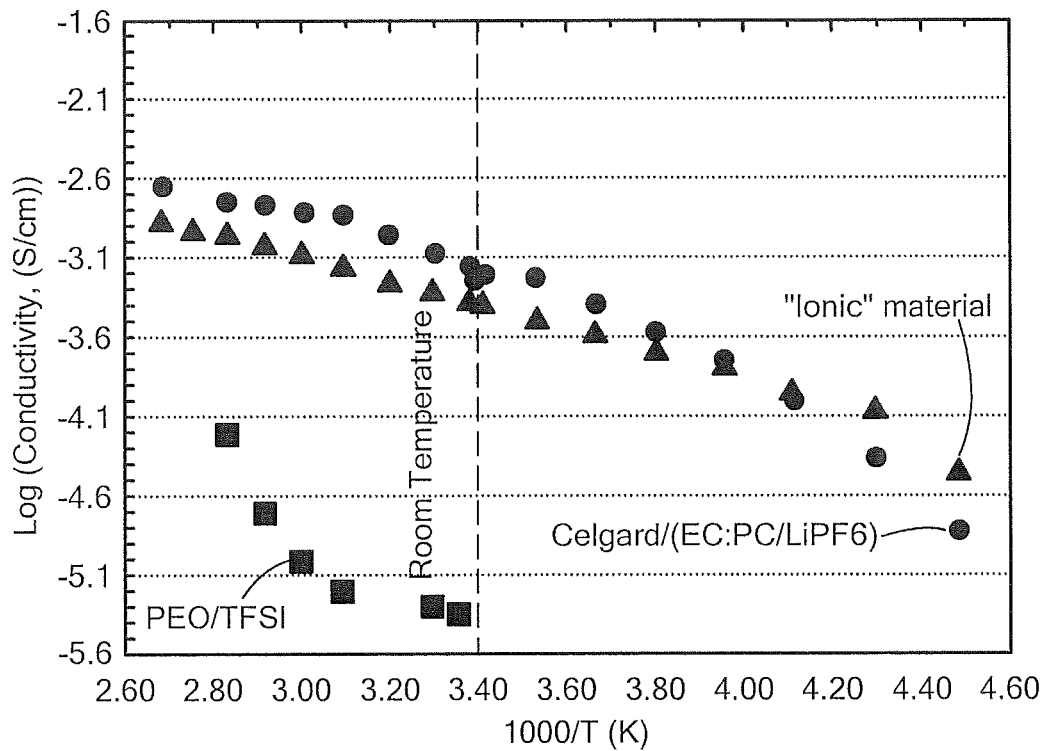
FIG. 6 exemplarily illustrates a plot of the conductivity of the ionically conductive polymer according to the invention in comparison with a liquid electrolyte and a polyethylene oxide lithium salt compound.

This application claims priority to U.S. patent application Ser. No. 14/559,430, filed Dec. 3, 2014 and U.S. Provisional Application No. 61/973,325, filed Apr. 1, 2014 each of which is incorporated herein by reference in its entirety for all purposes.

The invention comprises a cathode containing a solid, ionically conductive polymer material and a battery including the cathode. The solid ionically conductive polymer material includes a base polymer, a dopant, and at least one compound including an ion source. The polymer material has a capacity for ionic conduction over a wide temperature range including room temperature. It is believed that ion "hopping" occurs from a high density of atomic sites. Thus, the solid, ionically conductive polymer material can function as a means for conducting and supplying ions and while retaining the significant material strength of the base polymer.

For the purposes of this application, the term "polymer" is known in the art and refers to a macromolecule composed of many repeating subunits or monomers, and preferably the based polymer is a crystalline or semi-crystalline polymer. The base polymer can be selected depending upon the desired properties of the composition in relation to the desired application. For example, the thermoplastic, solid, ionically conductive polymer material can be molded into shapes thus allowing for desired electrode or battery component forms.

For purposes of the application, the term "dopant" refers to electron acceptors or oxidants or electron donors. The dopant is selected depending upon the desired properties of the composition in relation to the desired application. Similarly, the compound including an ion source is selected depending upon the desired properties of the composition in relation to the desired application.

I. Solid, Ionically Conductive Polymer Material for Li$^+$ Chemistries

In one aspect, the invention relates to the solid, ionically conductive polymer material used in a battery to conduct lithium ions.

In this aspect, the base polymer is characterized as having a crystallinity value of between 30% and 100%, and preferably between 50% and 100%. The base polymer has a glass transition temperature of above 80° C., and preferably above 120° C., and more preferably above 150° C., and most preferably above 200° C. The base polymer has a melting temperature of above 250° C., and preferably above 280° C., and more preferably above 320° C. The molecular weight of the monomeric unit of the base polymer of the invention is in the 100-200 gm/mol range and can be greater than 200 gm/mol. FIG. 1 shows the molecular structure of an exemplary base polymer, wherein the monomeric unit of the base polymer has a molecular weight of 108.16 g/mol. FIG. 2 exemplarily illustrates a dynamic scanning calorimeter curve of an exemplary semicrystalline base polymer. FIG. 3 illustrates exemplary formulations for the solid, ionically conducting polymer material in this aspect of the invention where DDQ is the dopant. Typical materials that can be used for the base polymer include liquid crystal polymers and polyphenylene sulfide also known as PPS, or any semi-crystalline polymer with a crystallinity index greater than 30%, and preferably greater than 50%. In one embodiment, the invention uses a "crystalline or semi-crystalline polymer", exemplarily illustrated in FIG. 4, which typically is above a crystallinity value of 30%, and has a glass transition temperature above 200° C., and a melting temperature above 250° C.

In this aspect, the dopant is an electron acceptor, such as, for non-limiting examples, 2,3-dicyano-5,6-dichlorodicyanoquinone ($C_8Cl_2N_2O_2$) also known as DDQ, Tetracyanoethylene($C_6N_4$) known as TCNE, chloranil and sulfur trioxide ($SO_3$). A preferred dopant is DDQ. FIG. 5 provides a chemical diagram of this preferred dopant. It is believed that the purpose of the electron acceptor is two-fold: to release ions for transport mobility, and to create polar high density sites within the polymer to allow for ionic conductivity. The electron acceptor can be "pre-mixed" with the initial ingredients and extruded without post-processing or alternatively, a doping procedure such as vapor doping can be used to add the electron acceptor to the composition after the material is created.

Typical compounds including an ion source for use in this aspect of the invention include, but are not limited to, $Li_2O$, LiOH, ZnO, $TiO_2$, $Al_2O_3$, and the like. The compounds containing appropriate ions which are in stable form can be modified after creation of the solid, polymer electrolytic film.

Other additives, such as carbon particles nanotubes and the like, can be added to the solid, polymer electrolyte including the solid, ionically conducting material to further enhance electrical conductivity or current density.

The novel solid polymer electrolyte enables a lighter weight and much safer architecture by eliminating the need for heavy and bulky metal hermetic packaging and protection circuitry. A novel solid polymer battery including the solid polymer electrolyte can be of smaller size, lighter weight and higher energy density than liquid electrolyte batteries of the same capacity. The novel solid polymer battery also benefits from less complex manufacturing processes, lower cost and reduced safety hazard, as the electrolyte material is non-flammable. The novel solid polymer battery is capable of cell voltages greater than 4.2 volts and is stable against higher and lower voltages. The novel solid polymer electrolyte can be formed into various shapes by extrusion (and co-extrusion), molding and other techniques such that different form factors can be provided for the battery. Particular shapes can be made to fit into differently shaped enclosures in devices or equipment being powered. In addition, the novel solid polymer battery does not require a separator, as with liquid electrolyte batteries, between the electrolyte and electrodes.

In another aspect of the invention, a solid polymer electrolyte including the solid, ionically conducting polymer material is in the form of an ionic polymer film. An electrode material is directly applied to each surface of the ionic polymer film and a foil charge collector or terminal is applied over each electrode surface. A light weight protective polymer covering can be applied over the terminals to complete the film based structure. The film based structure forms a thin film battery which is flexible and can be rolled or folded into intended shapes to suit installation requirements.

In yet another aspect of the invention, a solid polymer electrolyte including the solid, ionically conducting polymer material is in the form of an ionic polymer hollow monofilament. Electrode materials and charge collectors are directly applied (co-extruded) to each surface of the solid, ionically conducting polymer material and a terminal is applied at each electrode surface. A light weight protective polymer covering can be applied over the terminals to complete the structure. The structure forms a battery which is thin, flexible, and can be coiled into intended shapes to suit installation requirements, including very small applications.

In still another aspect of the invention, a solid polymer electrolyte including the solid, ionically conducting polymer material has a desired molded shape. Anode and cathode electrode materials can be disposed on respective opposite surfaces of the solid polymer electrolyte to form a cell unit. Electrical terminals can be provided on the anode and cathode electrodes of each cell unit for interconnection with other cell units to provide a multi cell battery or for connection to a utilization device.

In aspects of the invention relating to batteries, the electrode materials (cathode and anode) can be combined with a form of the novel solid, ionically conductive polymer material to further facilitate ionic movement between the two electrodes. This is analogous to a conventional liquid electrolyte soaked into each electrode material in a convention lithium battery.

Films of solid, ionically conducting polymer materials of the present invention have been extruded in thickness ranging upwards from 0.0003 inches. The ionic surface conductivity of the films has been measured using a standard test of AC-Electrochemical Impedance Spectroscopy (EIS) known to those of ordinary skill in the art. Samples of the solid, ionically conducting polymer material film were sandwiched between stainless steel blocking electrodes and placed in a test fixture. AC-impedance was recorded in the range from 800 KHz to 100 Hz using a Biologic VSP test system to determine the electrolyte conductivity. The results of the surface conductivity measurements are illustrated in FIG. 6. The conductivity of solid, ionically conductive polymer material film according to the invention (A) is compared with that of trifluoromethane sulfonate PEO ( ) and a liquid electrolyte made up of a Li salt solute and a EC:PC combination solvent using a Celgard separator (O). The conductivity of the solid, ionically conducting polymer material film according to the invention tracks the conductivity of the liquid electrolyte and far surpasses that of trifluoromethane sulfonate PEO at the lower temperatures. Further, unlike PEO electrolytes, the temperature dependence of the conductivity for inventive polymer material does not display a sharp increase above its glass transition temperature, associated with chain mobility, as described by Vogel-Tamman-Fulcher behavior activated by temperature. Therefore, segmental movement as the ion-conduction mechanism in the inventive polymer material is unlikely. Furthermore, this demonstrates that the inventive polymer material has similar ionic conductivity to liquid electrolytes.

Figure 7:
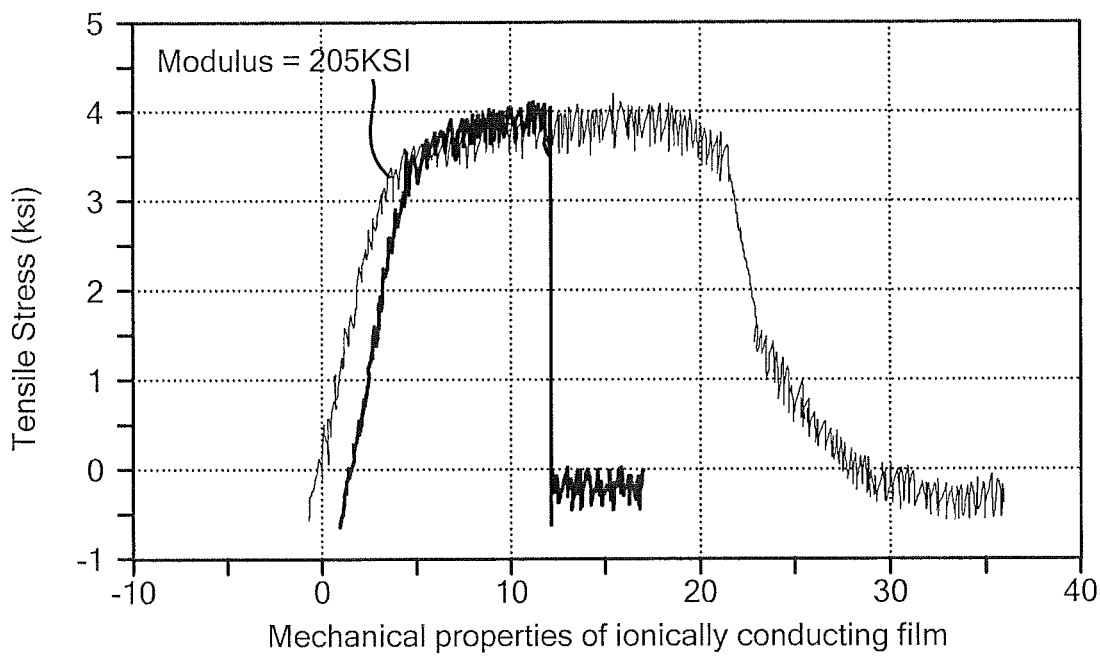
FIG. 7 exemplarily illustrates the mechanical properties of the ionically conducting film according to the invention.

FIG. 7 shows the mechanical properties of the solid, ionically conductive polymer material films of the invention. The mechanical properties were evaluated using the Institute for Interconnecting and Packaging Electronic Circuits IPC-TM-650 Test Methods Manual 2.4.18.3. In the tensile strength versus elongation curve of FIG. 7, the "ductile failure" mode indicates that the material can be very robust.

The solid, ionically conductive polymer material of the invention offers three key advantages in its polymer performance characteristics: (1) It has an expansive temperature range. In lab-scale testing, the crystalline polymer has shown high ionic conductivity both at room temperature and over a wide temperature range. (2) It is non-flammable. The polymer self-extinguishes, passing the UL-V0 Flammability Test. The ability to operate at room temperature and the non-flammable characteristics demonstrate a transformative safety improvement that eliminates expensive thermal management systems. (3) It offers low-cost bulk manufacturing. Rather than spraying the polymer onto electrodes, the polymer material can be extruded into a thin film via a roll-to-roll process, an industry standard for plastics manufacturing. After the film is extruded, it can be coated with the electrode and charge collector materials to build a battery "from the inside out." This enables thin, flexible form factors without the need for hermetic packaging, resulting in easy integration into vehicle and storage applications at low cost.

It is believed that the solid, ionically conducting polymer material of the present invention creates a new ionic conduction mechanism that provides a higher density of sites for ionic transport and allows the conducting material to maintain higher voltages without risk of thermal runaway or damage to ion transport sites from, for example, lithiation. This characteristic enables the solid, ionically conducting polymer material to be durable for anode materials and higher voltage cathode thin-film applications, resulting in higher energy densities for batteries which may be used in vehicle and stationary storage applications. The ability to maintain high voltages within a solid, ionically conductive polymer material which is mechanically robust, chemical and moisture resistant, and nonflammable not only at room temperature, but over a wide range of temperatures, allows integration with high performance electrodes without costly thermal and safety mechanisms employed by the industry today.

Figure 8:
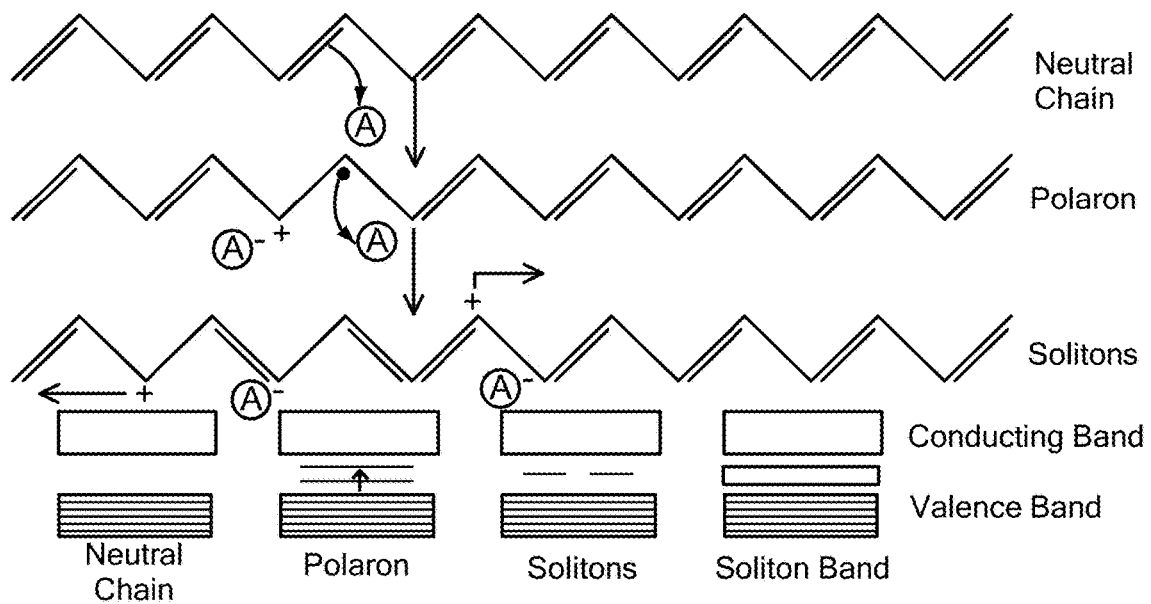
FIG. 8 exemplarily illustrates possible mechanisms of conduction of the solid electrolyte polymer according to the invention.

FIG. 8 shows possible mechanisms of conduction of the solid, ionically conducting polymer material in a solid polymer electrolyte aspect of the invention. Charge carrier complexes are set up in the polymer as a result of the doping process.

Figure 9:
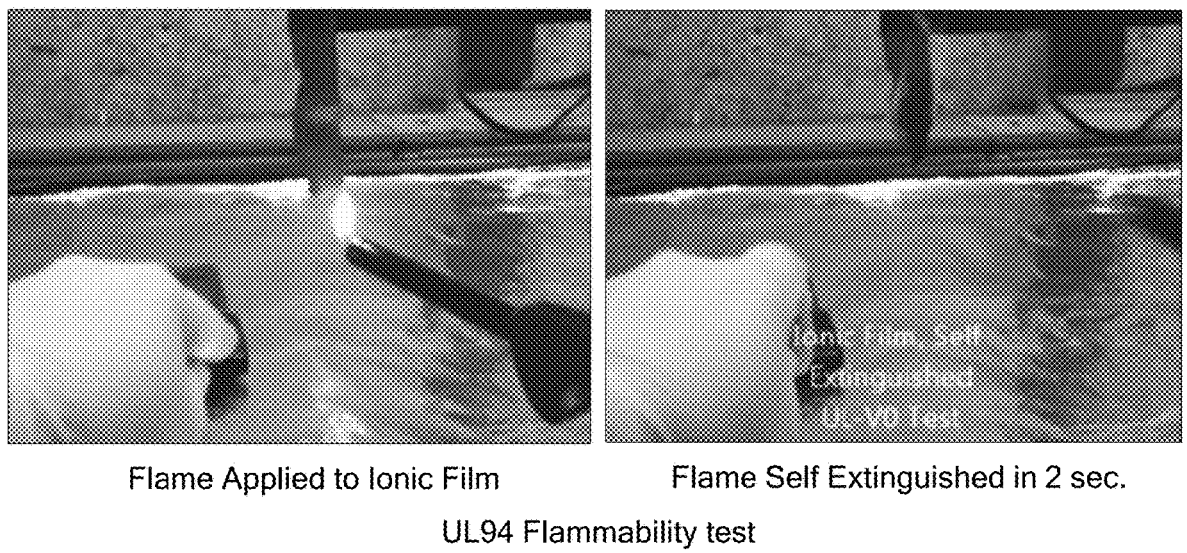
FIG. 9 exemplarily shows a UL94 flammability test conducted on a polymer according to the invention.

Flammability of the solid polymer electrolyte including the solid, ionically conductive polymer material of the invention was tested using a UL94 flame test. For a polymer to be rated UL94-V0, it must "self-extinguish" within 10 seconds and 'not drip". The solid polymer electrolyte was tested for this property and it was determined that it self-extinguished with 2 seconds, did not drip, and therefore easily passed the V0 rating. FIG. 9 shows pictures of the result.

Figure 10:
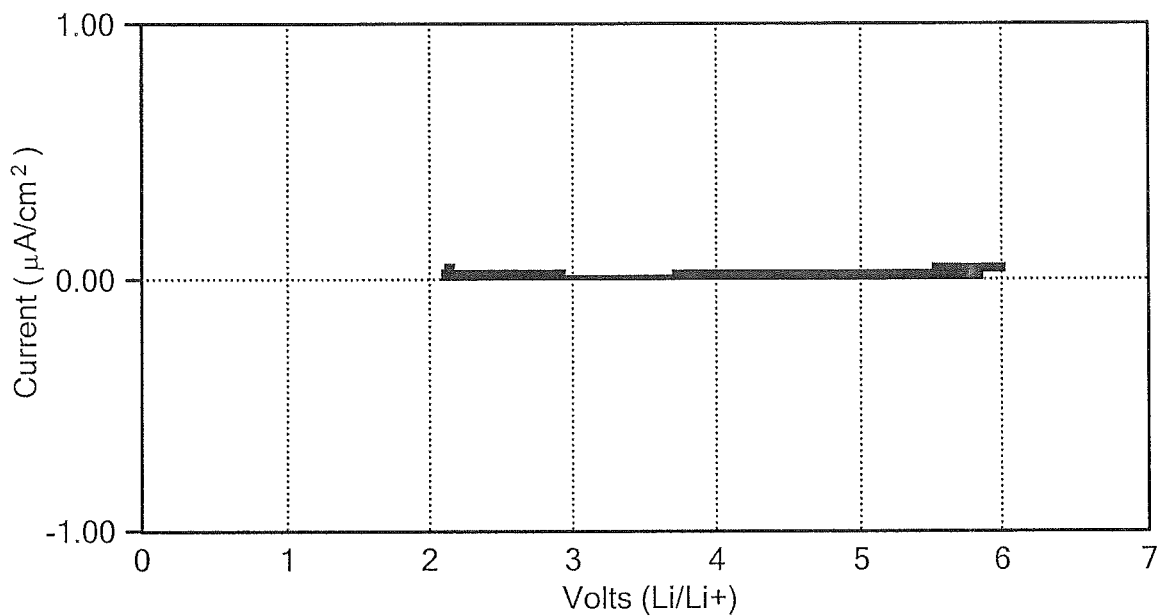
FIG. 10 exemplarily shows a plot of volts versus current of an ionically conductive polymer according to the invention versus lithium metal.

In addition to the properties of ionic conductivity, flame resistance, high temperature behavior, and good mechanical properties, it is preferable that the solid polymer electrolyte including the solid, ionically conductive polymer material of the invention is electrochemically stable at low and high potentials. The traditional test for the electrochemical stability is cyclic voltammetry, when working electrode potential is ramped linearly versus time. In this test, the polymer is sandwiched between a lithium metal anode and blocking stainless steel electrode. A voltage is applied and it is swept positively to a high value (greater than 4 volts vs. Li) for stability towards oxidation and negatively to a low value (0V vs. Li or less) for stability towards reduction. The current output is measured to determine if any significant reaction occurs at the electrode interface. High current output at high positive potential would signify oxidation reaction taking place, suggesting instability with cathode materials operating at these or more positive potentials (such as many metal oxides). High current output at low potentials would signify that a reduction reaction takes place, suggesting instability with anodes operating at these or more negative potentials (such as metal Li or lithiated carbon). FIG. 10 shows a plot of voltage versus current for a solid polymer electrolyte including the solid, ionically conductive polymer material according to the invention versus lithium metal. The study shows that the solid polymer electrolyte is stable up to about 4.6 volts. These results indicate that the solid polymer electrolyte could be stable with cathodes including LCO, LMO, NMC and similar cathodes, along with low voltage cathodes such as, for non-limiting examples iron phosphate and sulfur cathodes.

The solid polymer electrolyte including the solid, ionically conductive polymer material of the invention is able to achieve the following properties: A) high ionic conductivity at room temperature and over a wide temperature range (at least −10° C. to +60° C.); B) non-flammability; C) extrudability into thin films allowing for reel-reel processing and a new way of manufacturing; D) compatibility with Lithium metal and other active materials. Accordingly, this invention allows for the fabrication of a true solid state battery. The invention allows for a new generation of batteries having the following properties: no safety issues; new form factors; large increases in energy density; and large improvements in cost of energy storage.

Figure 11:
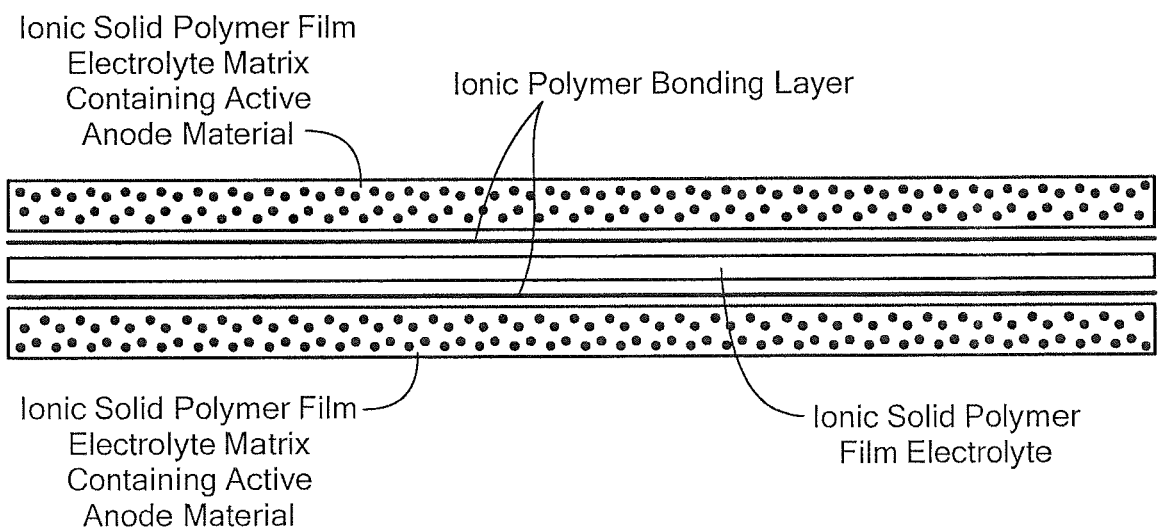
FIG. 11 exemplarily illustrates a schematic of extruded ionically conductive electrolyte and electrode components according to the invention.
Figure 12:
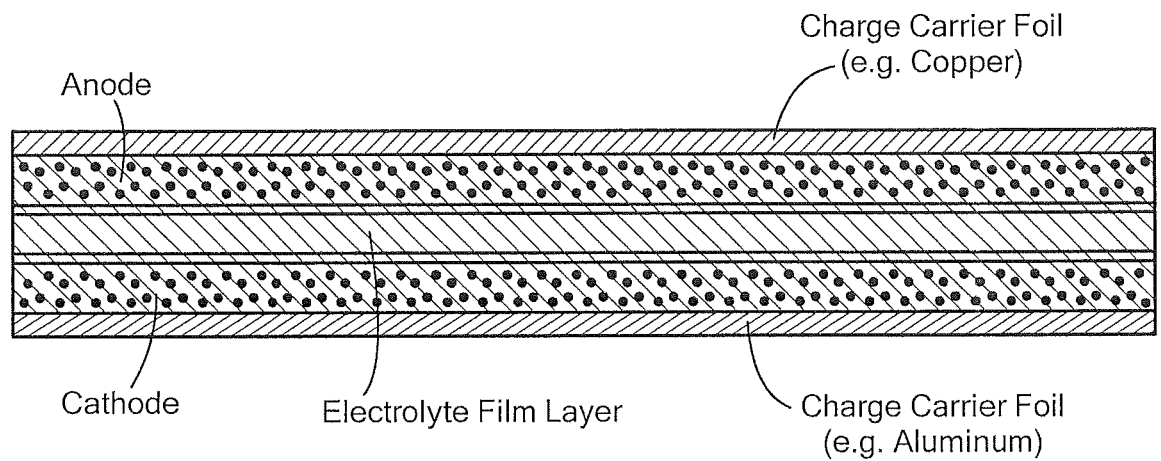
FIG. 12 exemplarily illustrates the solid state battery according to the invention where electrode and electrolyte are bonded together.
Figure 13:
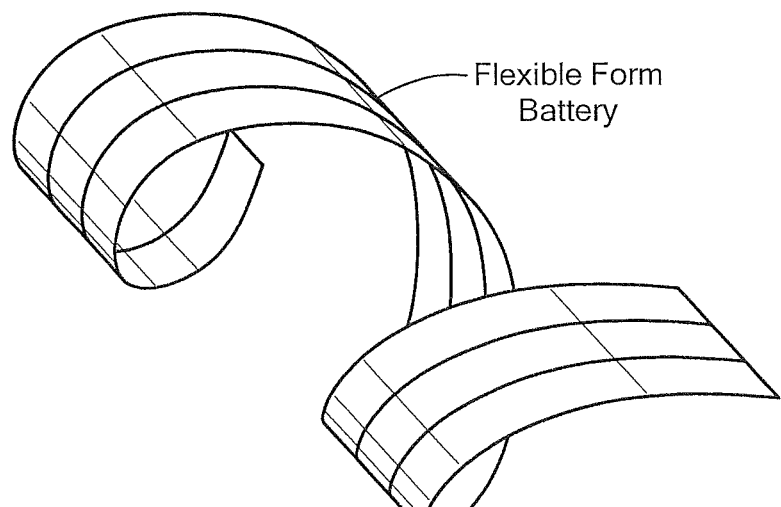
FIG. 13 exemplarily illustrates a final solid state battery according to the invention having a new and flexible form.

FIGS. 11, 12 and 13 show several elements of the solid state battery including the solid, ionically conductive polymer material of the invention which are, respectively: A) an extruded electrolyte; B) extruded anodes and cathodes; and C) a final solid state battery allowing for new form factors and flexibility.

Figure 14:
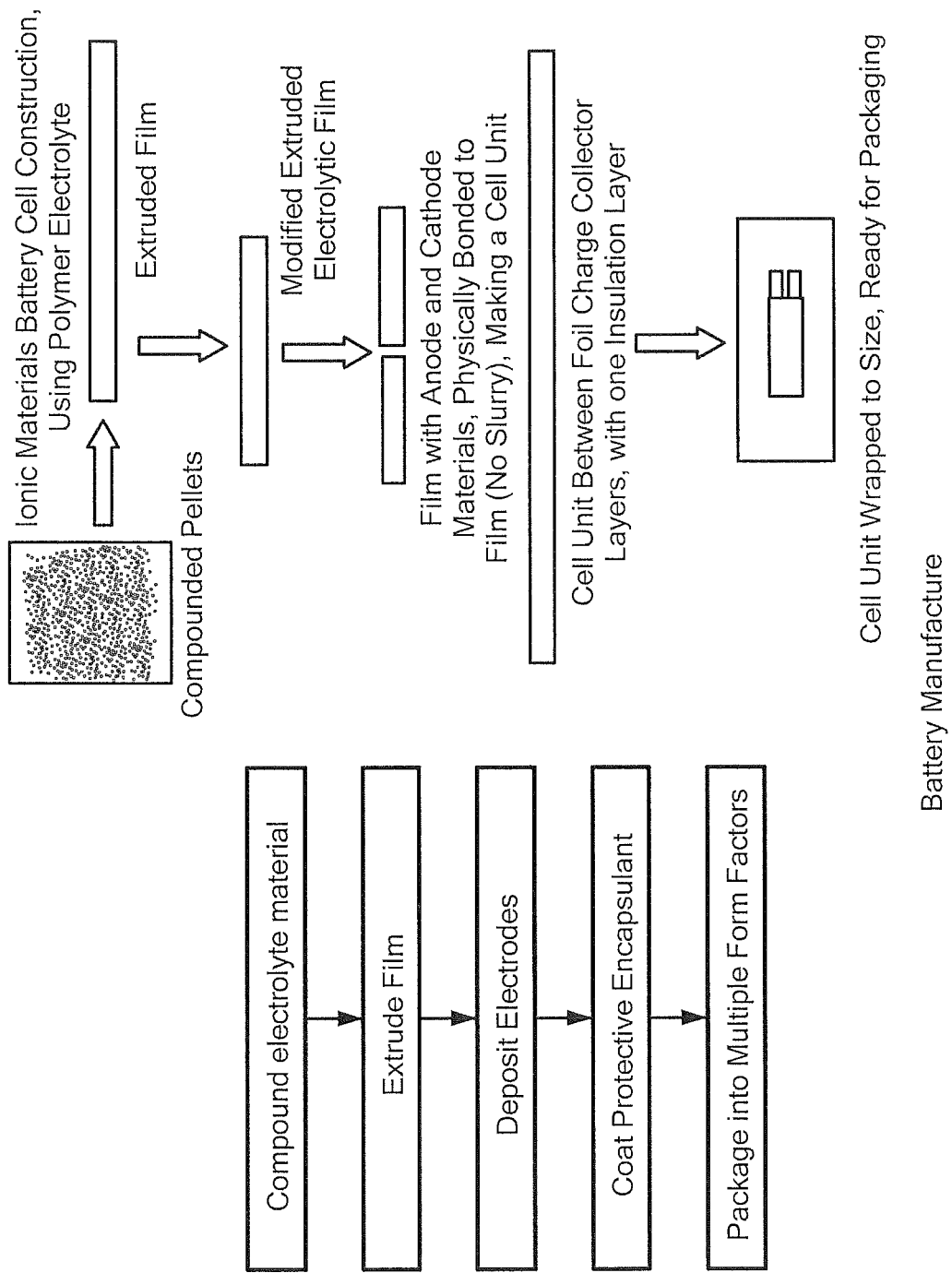
FIG. 14 exemplarily illustrates a method of the invention including steps for manufacturing a solid state battery using an extruded polymer.

In other aspects, the invention provides methods for making Li batteries including the solid, ionically conducting polymer material of the invention. FIG. 14 shows a method of manufacturing a solid state lithium ion battery using an extruded solid, ionically conducting polymer material according to the invention. The material is compounded into pellets, and then extruded through a die to make films of variable thicknesses. The electrodes can be applied to the film using several techniques, such as sputtering or conventional casting in a slurry.

Figure 16:
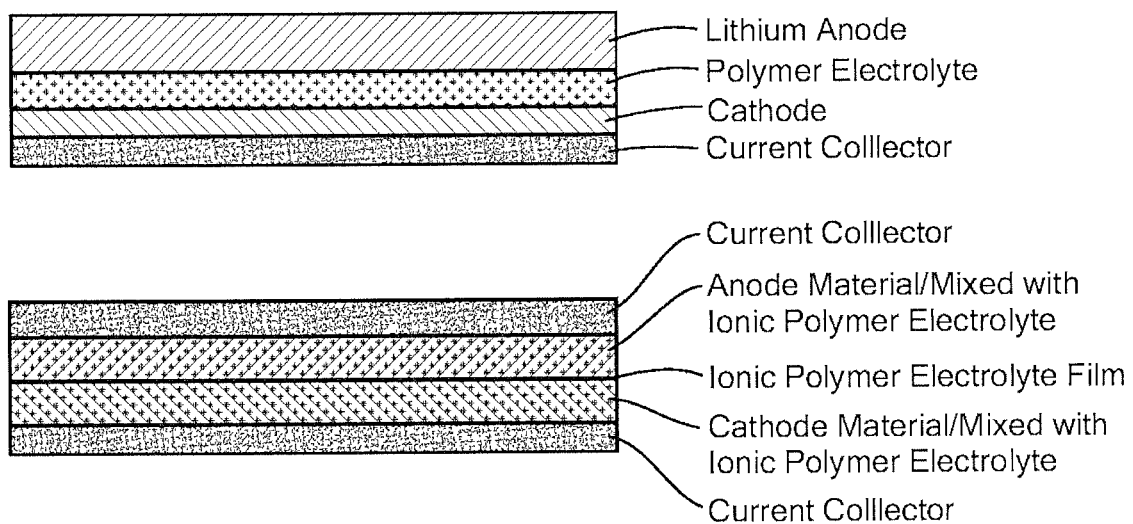
FIG. 16 exemplarily illustrates a schematic representation of an embodiment according to the invention.

In yet another aspect, the invention provides a method of manufacturing of an ionic polymer film including the solid, ionically conductive polymer material of the invention which involves heating the film to a temperature around 295° C., and then casting the film onto a chill roll which solidifies the plastic. This extrusion method is shown in FIG. 15. The resulting film can be very thin, in the range of 10 microns thick or less. FIG. 16 shows a schematic representation of the architecture of an embodiment according to the invention.

II. Polymer-Sulfur Cathode

In addition, the invention relates to a composite polymer-sulfur cathode. The composite polymer-sulfur cathode includes a sulfur component and a solid, ionically conducting polymer material including a base polymer, a dopant and a compound including a source of ions. The composite polymer-sulfur cathode is characterized as having a high specific capacity and a high capacity retention when employed in a secondary lithium or Li-ion sulfur cell. The composite cathode is characterized as having a specific capacity of greater than 200 milliamp-hr/gm, and preferably greater than 500 milliamp-hr/gm, and more preferably greater than 750 milliamp-hr/gm, and most preferably greater than 1000 milliamp-hr/gm. The composite cathode is characterized as having a retention of least 50% and preferably at least 80% for over 500 recharge/discharge cycles. The composite polymer-sulfur cathode of the present invention has direct application to low-cost, large-scale manufacturing enabled by the unique polymer used in this composite electrode. The composite polymer-sulfur cathode of the invention can provide high performance while simultaneously meeting the requirements for producing low-cost batteries.

Notably, sulfur cathodes reduce during discharge to create sequentially lower order polysulfides through the sequence illustrated in the following equation:

$$S_8 \rightarrow Li_2S_8 \rightarrow Li_2S_4 \rightarrow Li_2S_2 \rightarrow Li_2S$$

The intermediate polysulfides between $Li_2S_8$ and $Li_2S_4$ are soluble in liquid electrolytes. Thus, dissolved polysulfide particles are able to migrate (or "shuttle") across porous separators and react directly with the anode and cathode during cycling. The polysulfide shuttle produces parasitic reactions with the lithium anode and re-oxidation at the cathode, all causing capacity loss. Furthermore, aspects of this shuttle reaction are irreversible, leading to self-discharge and low cycle life that has, until now, plagued lithium sulfur batteries.

The present invention demonstrates a composite polymer-sulfur cathode including a sulfur component and a solid, ionically conducting polymer material. This cathode can be extruded into a flexible, thin film via a roll-to-roll process. Such thin films enable thin, flexible form factors which can be incorporated into novel flexible battery designs. As shown in the examples which follow, this composite polymer-sulfur cathode can include an electrically conductive additive such as, for example, an inexpensive carbon black component, such as Timcal C45, which is already in use for many commercial battery products. In addition to the exemplary carbon black component, the composite polymer-sulfur cathode can include other electrically conductive additives such as, for non-limiting examples, a carbon component including but not limited to carbon fibers, a graphene component, a graphite component, metallic particles or other metal additives, and an electrically conductive polymer.

The engineering properties of the composite polymer-sulfur cathode allow the extrusion of the cathode into a wide range of possible thicknesses, which in turn provides important advantages in terms of flexibility in design in large-scale cathode manufacturing. The composite polymer-sulfur cathode can be extruded as thin as 5 microns and up to thicknesses greater than several 100 microns.

Figure 17:
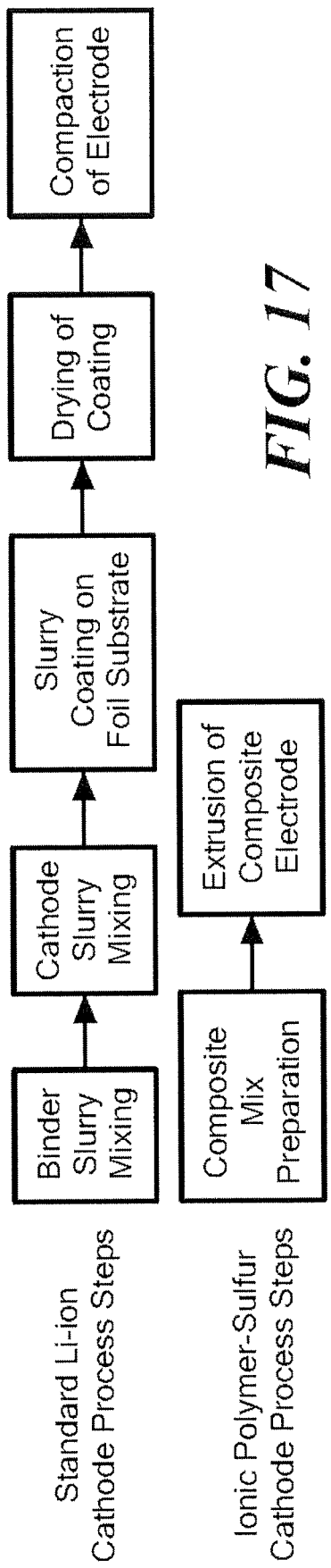
FIG. 17 exemplarily illustrates a comparison of process steps for standard Li-ion cathode manufacturing with those for extrusion of the composite polymer-sulfur cathode of the invention.
Figure 18:
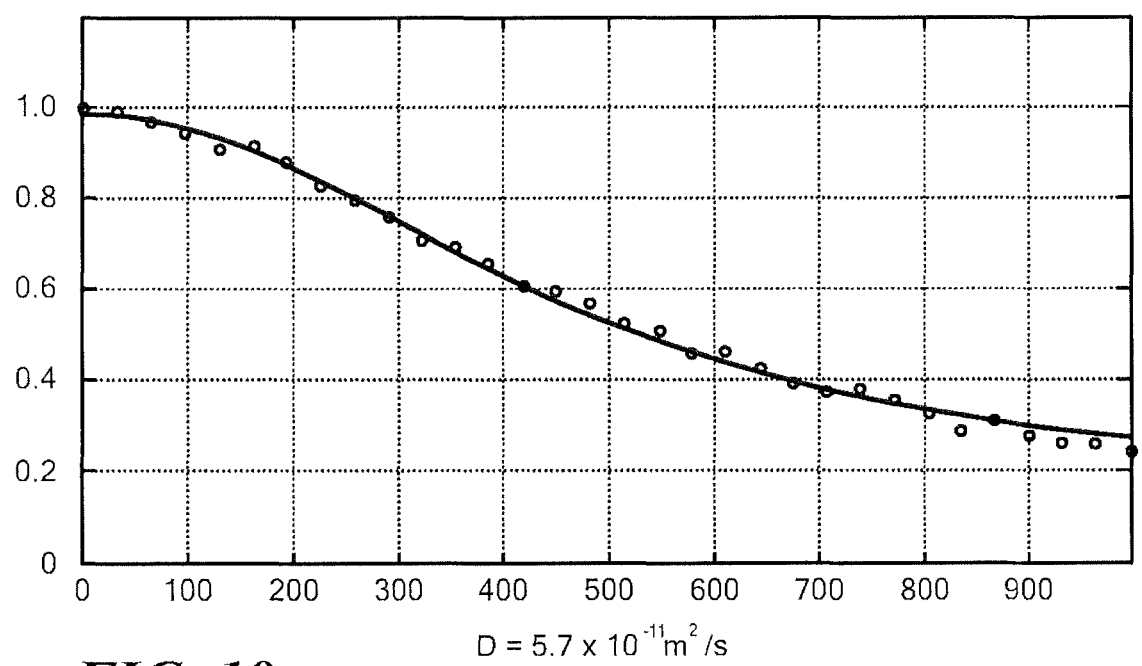
FIG. 18 exemplarily illustrates lithium diffusivity at room temperature in a solid polymer electrolyte of the invention.

A comparison of the process steps necessary for producing standard lithium ion cathodes with those necessary to produce the inventive composite polymer-sulfur cathode is instructive relative to the inherent lower cost of the composite polymer-sulfur cathode manufacturing. FIG. 17 illustrates the process steps needed to manufacture a standard lithium ion cathode compared with the much simpler manufacturing of an extruded composite polymer-sulfur cathode of the invention. The extrusion process for the composite polymer-sulfur cathode is easily scaled-up to high volume manufacturing which provides a significant advantage over existing lithium ion battery, as well as a much lower capital expenditure for factory equipment.

In addition to extrusion, the composite polymer-sulfur cathode can be formed by injection molding, compression molding, or any other process involving heat, or other techniques known by those skilled in the art for engineering plastics.

The composite polymer-sulfur cathode includes a sulfur component and a solid, ionically conducting polymer material including a base polymer, a dopant and a compound including a source of ions, as discussed above.

The sulfur component can include non-reduced and/or reduced forms of sulfur including elemental sulfur. In particular, the composite polymer-sulfur cathode includes a sulfur component including the fully lithiated form of sulfur ($Li_2S$), wherein the $Li_2S$, is a solid. The composite polymer-sulfur cathode can also include a carbon component. The advantage to using the fully lithiated form of sulfur is that it provides a lithium source for a sulfur battery with a Li Ion anode, which, unlike metal Li, must by lithiated during initial charge. Combination of a sulfur cathode with a Li-ion anode provides benefit in preventing the formation of lithium dendrites which can be formed after cycling lithium anodes. Dendrites are caused by a non-uniform plating of lithium onto the lithium metal anode during charging. These dendrites can grow through separator materials and cause internal short circuits between cathode and anode, often leading to high temperatures and compromised safety of the battery. Materials that reversibly incorporate lithium, either through intercalation or alloying, lessen the chance for dendrite formation and have been proposed for use in high safety lithium/sulfur cells. The composite polymer-sulfur cathode can be used with an anode material such as, for example, a carbon-based (petroleum coke, amorphous carbon, graphite, carbon nano tubes, graphene, etc.) material, Sn, SnO, $SnO_2$ and Sn-based composite oxides, including composites with transition metals, such as Co, Cu, Fe, Mn, Ni, etc. Furthermore, silicon has shown promise as a lithium ion anode material, in the elemental form, or as an oxide or composite material, as described for tin. Other lithium alloying materials (for example, Ge, Pb, B, etc.) could also be used for this purpose. Oxides of iron, such as $Fe_2O_3$ or $Fe_3O_4$ and various vanadium oxide materials have also been shown to reversibly incorporate lithium as a Li-ion anode material. Anode materials may be considered in different forms, including amorphous and crystalline, and nano-sized particles as well as nano-tubes.

The composite polymer-sulfur cathode can be combined with a standard liquid electrolyte, a standard nonwoven separator, and/or an electrolyte including a solid, ionically conducting polymer material with no liquid electrolyte. An example of a standard organic electrolyte solution includes a lithium salt, such as lithium bis(trifluoromethane sulfonyl) imide (LiTFSI), dissolved in a mixture of 1,3-dioxolane (DOL) and 1,2-dimethoxyethane (DME). Additives, such as $LiNO_3$, can be added to the electrolyte to improve cell performance. Other lithium salts can be utilized in organic liquid electrolyte, including: $LiPF_6$, $LiBF_4$, $LiAsF_6$, lithium triflate, among others. Additionally, other organic solvents can be used, such as propylene carbonate (PC), ethylene carbonate (EC), diethyl carbonate (DEC), dimethyl carbonate (DMC), ethyl methyl carbonate (EMC), fluoroethylene carbonate (FEC), as a few examples, either alone or as mixtures together or with DOL and DME. Examples of standard nonwoven separators include polypropylene (PP), polyethylene (PE), and combinations of PP/PE films. Other separator materials include polyimide, PTFE, ceramic coated films and glass-mat separators. All of the above materials can be used with the composite polymer-sulfur cathode. Further, the composite polymer-sulfur cathode could also be utilized in a gel-polymer system, where for example, a PVDF-based polymer is swelled with an organic electrolyte.

It is believed that the ability of the composite polymer-sulfur cathode to provide lithium ionic conductivity improves the performance of the cell by limiting the polysulfide shuttle mechanism, while simultaneously providing a sulfur cathode with high voltage. Furthermore, this unique engineering composite polymer-sulfur cathode allows for the large scale, low cost manufacturing necessary for commercial viability of the cathode.

Thus, the unique composite polymer-sulfur cathode has numerous potential benefits to batteries, including those illustrated and described in the following examples.

Example 1

Solid polymer electrolyte was made by mixing PPS base polymer and ion source compound LiOH monohydrate in the proportion of 67% to 33% (by wt.), respectively, and mixed using jet milling. DDQ dopant was added to the resulting mixture in the amount of 1 mole of DDQ per 4.2 moles of PPS. The mixture was heat treated at 325/250° C. for 30 minutes under moderate pressure (500-1000 PSI). After cooling, the resulting material was grinded and placed into NMR fixture.

Self-diffusion coefficients were determined by using pulsed field gradient solid state NMR technique. The results shown in FIG. 20 indicates, that $Li^+$ diffusivity in the solid polymer electrolyte is the highest of any known solid, and over an order of magnitude higher at room temperature compared to recently developed $Li_{10}GeP_2S_{12}$ ceramic at much higher temperatures (140° C.) or the best PEO formulation at 90° C.

Example 2

PPS base polymer and ion source compound LiOH monohydrate were added together in the proportion of 67% to 33% (wt/wt), respectively, and were mixed using jet milling. DDQ dopant was added to the resulting mixture in the amount of 1 mole of DDQ per 4.2 moles of PPS. The mixture was compression molded at 325° C./250° C. for 30 minutes under low pressure. The polymer-sulfur composite cathode was prepared by additionally mixing from 25% to 50% of sulfur powder, 5% to 15% of C45 carbon black, and 0% to 10% $LiNO_3$ with the solid, ionically conducting polymer material. The materials were compression molded onto stainless steel mesh (Dexmet) at 120° C. for 30 minutes, yielding a cathode disc 15 mm in diameter and 0.3 to 0.4 mm thick.

The resulting cathodes were used to assemble test cells in 2035 coin cell hardware. Polypropylene separator (Celgard) 25 microns thick and 19 mm in diameter was used along with lithium foil anode material, 15 mm in diameter. A liquid electrolyte of 1M LiTFSI salt dissolved in a 50/50 (vol/vol) mixture of DOL/DME was used, with 0.5M $LiNO_3$ additive. The cells were assembled in an argon gas filled glove box, with low oxygen and water levels.

Cells were discharged under constant current conditions (1 mA) using a Maccor 4600 battery test system. Discharge was terminated at a voltage of 1.75 V.

Figure 19:
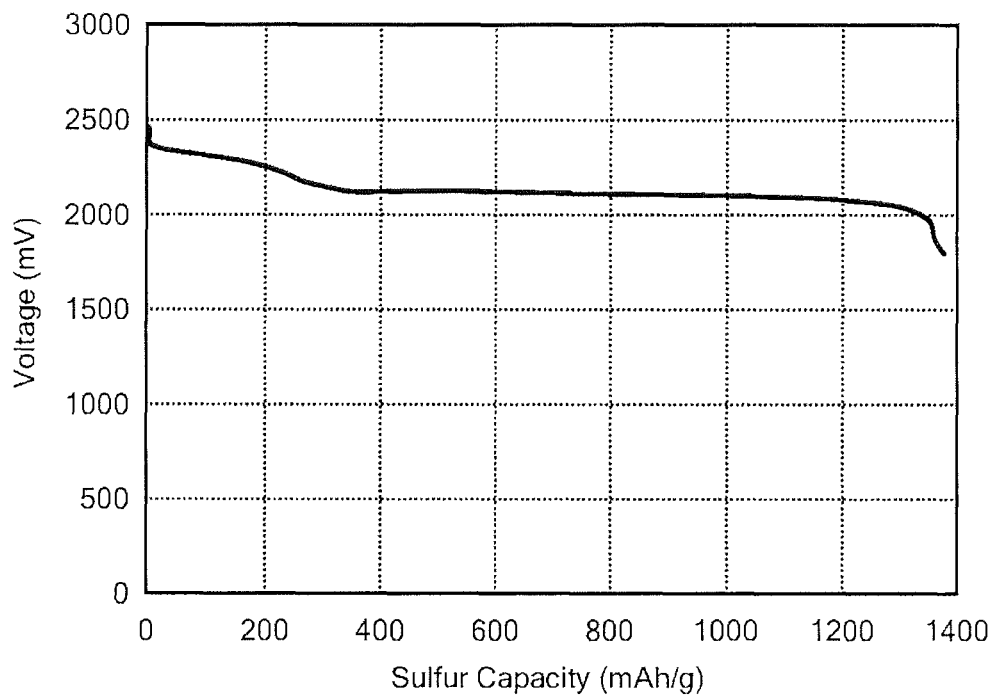
FIG. 19 exemplarily illustrates a first discharge voltage curve for Li/Ionic polymer-sulfur cell of the present invention.

FIG. 19 shows a first cycle discharge voltage curve for a Li/composite polymer-sulfur cathode in a cell of the present invention. The composite polymer-sulfur cathode provides a high initial capacity of greater than 1300 mAh/g, based on the amount of sulfur in the cathode. The FIG. 19 discharge voltage curve displays two plateaus, at ~2.3V and ~2.1V. This shows that the composite polymer-sulfur system enables high capacity, while producing the expected voltage curve for a lithium/sulfur system, consistent with a stable electrochemical couple.

Example 3

Composite polymer-sulfur cathodes were manufactured as described in Example 16. These cathodes were assembled into coin cells using lithium metal anodes, polypropylene separator, and 1M LiTFSI in DOL/DME electrolyte with 0.5M $LiNO_3$ additive.

Cells were discharged under constant current conditions (1 mA) using a Maccor 4600 battery test system. Discharge was terminated at a voltage of 1.75 V. Charge was accomplished in two steps, the first at a lower charge rate of 0.2 mA current to a maximum voltage of 2.3 V, and the second charge step at a higher rate of 1 mA current to a maximum voltage of 2.45 V. The overall charge capacity was limited for these test cells. These cells were allowed to cycle several times at room temperature.

Figure 20:
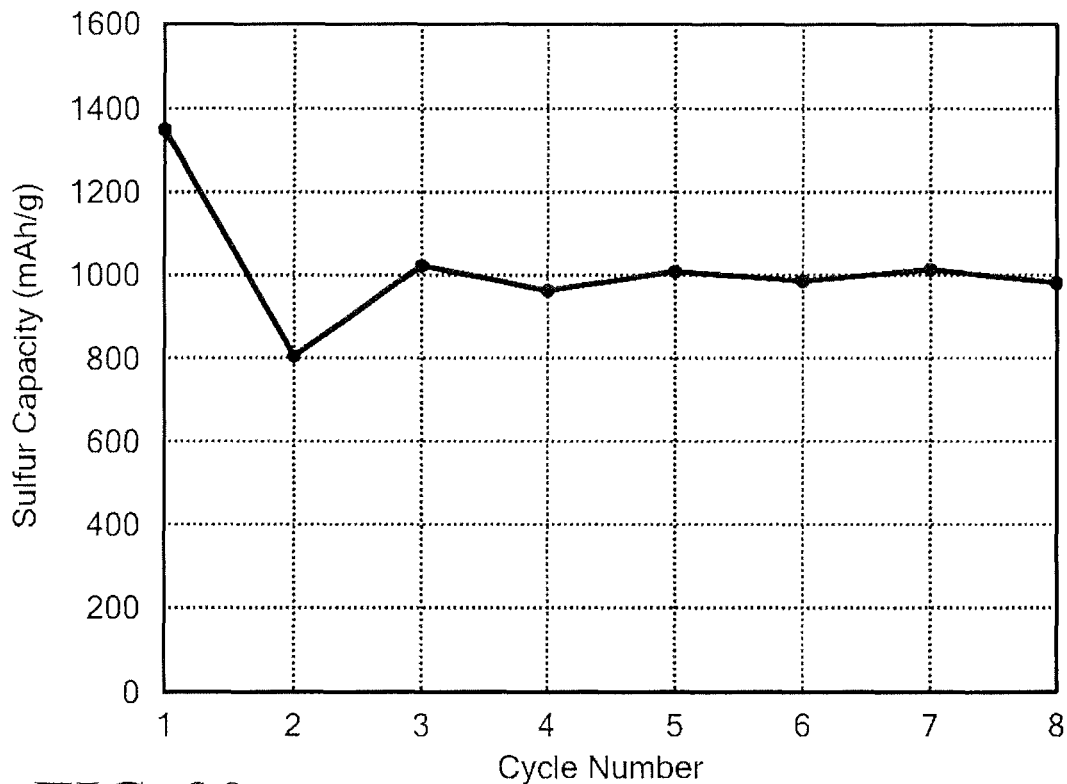
FIG. 20 exemplarily illustrates a discharge capacity curve plotted as a function of cycle number for Li/Ionic polymer-sulfur cell of the present invention.

FIG. 20 shows the discharge capacity curve plotted as a function of cycle number for Li/composite polymer-sulfur cell of the present invention. The capacity curve graph shows that the composite polymer-sulfur cathode will support reversible charge/discharge, with high reversible capacity of at least 1000 mAh/g based on the amount of sulfur in the cathode.

Example 4

As an alternative preparation of a polymer-sulfur cathode, a mixture of PPS polymer, LiOH monohydrate filler, sulfur powder, C45 carbon black and polyvinylidene fluoride (PVDF) binder were slurry coated onto a conductive foil substrate. The PVDF was added to provide adhesion to the foil, and was pre-dissolved in N-methyl pyrrolidone (NMP) solvent. The materials were mixed to provide a slurry, which was cast onto the foil and then dried to remove the NMP. The slurry-cast polymer-sulfur composite cathode contained from 25% to 50% by weight of sulfur powder, 5% to 35% of C45 carbon black, with the solid, ionically conducting polymer material, filler and PVDF binder constituting the reminder of the cathode coating. The cathode was compressed and cut to a disk, 15 mm in diameter, to fit the test cell.

The slurry-cast cathodes were used to assemble test cells in 2035 coin cell hardware. Polypropylene separator (Celgard) 25 microns thick and 19 mm in diameter was used along with lithium foil anode material, 15 mm in diameter. A liquid electrolyte of 1M LiTFSI salt dissolved in a 50/50 (vol/vol) mixture of DOL/DME was used, with 0.5M $LiNO_3$ additive. The cells were assembled in an argon gas filled glovebox, with low oxygen and water levels.

Cells were discharged under constant current conditions (1.5 mA) using a Maccor 4600 battery test system. Discharge was terminated at a voltage of 1.75 V. Charge was accomplished in two steps, the first at a lower charge rate of 0.2 mA current to a maximum voltage of 2.3 V, and the second charge step at a higher rate of 1 mA current to a maximum voltage of 2.45 V. The overall charge capacity was limited for these test cells. These cells were allowed to cycle several hundreds of times at room temperature. FIG. 21 shows the discharge capacity for a cell to ~2000 cycles. This graph shows that the Ionic polymer-sulfur cathode will support reversible charge/discharge for many cycles with no evidence of short circuits due to lithium dendrites.

Example 5

Slurry-cast polymer-sulfur cathodes were manufactured as described in Example 2, except that the cathodes were cut into larger 4.9×8.1 cm rectangular electrodes. The cathodes were coated with the electro-active solid, ionically conducting polymer material-sulfur mixture on both sides of the conductive foil substrate to form a polymer-sulfur cathode. These cathodes were assembled into pouch cells using lithium metal anodes (4.9×8.1 cm), polypropylene separator, and 1M LiTFSI in DOL/DME electrolyte with 0.5M $LiNO_3$ additive. The cells were vacuum sealed inside an inert atmosphere glove box which was low in water and oxygen.

The pouch cells were discharged under constant current conditions (9 mA) using a Maccor 4600 battery test system. Discharge was terminated at a voltage of 1.75 V. The discharge voltage profile for the first cycle is displayed in FIG. 22. It can be seen that the polymer-sulfur cathode provides a high initial capacity of greater than 1300 mAh/g, based on the amount of sulfur in the cathode. The cell in FIG. 22 also displays a discharge voltage curve with two plateaus, at ~2.3V and ~2.1V, identical to that found for coin cells, as displayed in Example 2 (FIG. 19). This shows that the slurry-cast Ionic polymer-sulfur system enables high capacity, and this technology is scalable to larger pouch cells that have relevance to many commercial applications.

Comparative Example 6

Figure 23:
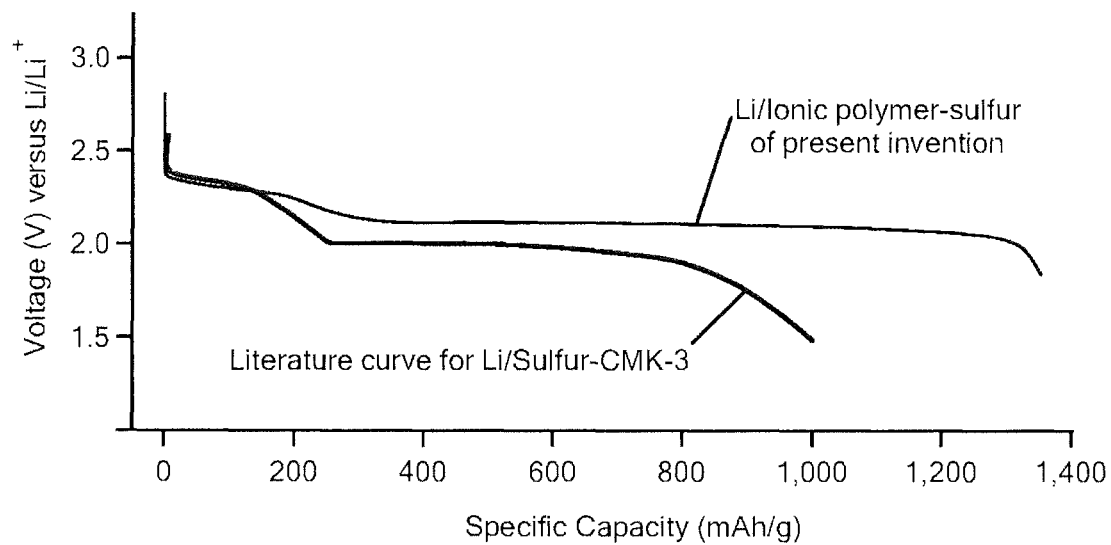
FIG. 23 exemplarily illustrates a comparison of first discharge for literature example Li/Sulfur-CMK-3 with Li/Ionic polymer-sulfur of present invention.

A noteworthy example of a highly ordered interwoven composite electrode is presented in the literature [Ji, X.; Lee, K. T.; Nazar, L. F. *Nature Materials* 2009, 8, 500-506]. This composite cathode utilized CMK-3 mesoporous carbon with sulfur entrenched in the pores through heat treatment at 155° C. FIG. 23 compares the first discharge for literature example Li/Sulfur-CMK-3 with Li/composite polymer-sulfur of present invention.

The composite cathode in this example was slurry-cast from cyclopentanone onto a carbon coated aluminum current collector. The cathode utilized 84 wt % CMK-3/S composite, 8 wt % Super-S carbon and 8 wt % PVDF binder. The electrolyte was composed of 1.2M $LiPF_6$ in ethyl methyl sulphone, and Li metal was used as the anode. In comparison, the results for the composite polymer-sulfur cathode of the invention, as described in Example 2, are plotted on the same graph. It is apparent that the composite polymer-sulfur cathode of the invention gives as good, or better, results than literature examples of composite sulfur cathodes.

Comparative Example 7

Figure 24:
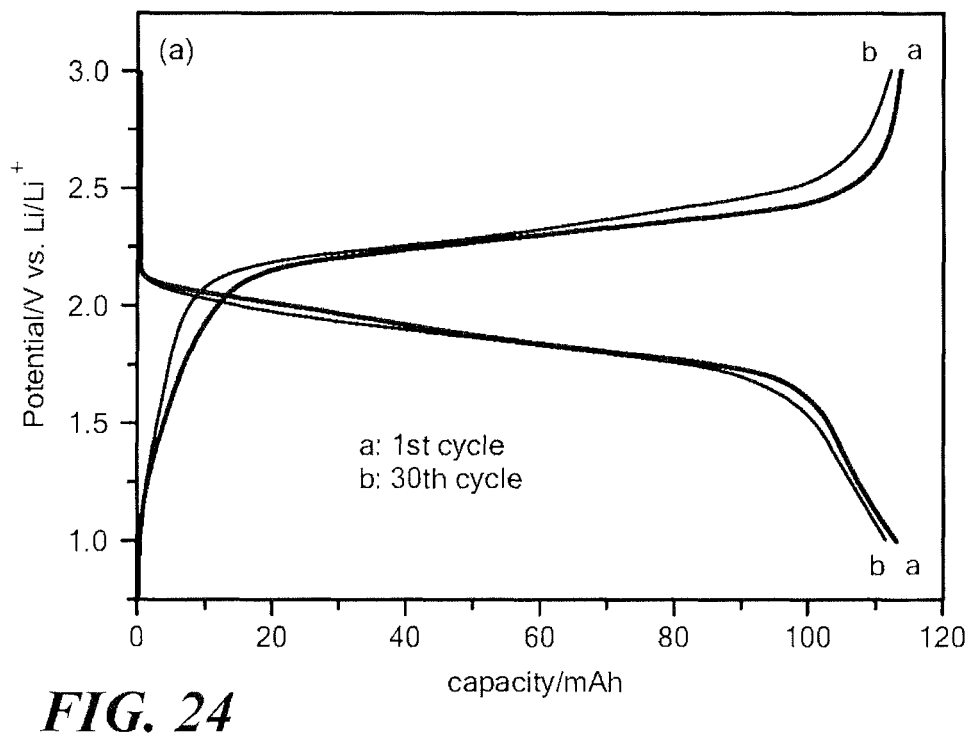
FIG. 24 illustrates a charge/discharge voltage curves for a Li/sulfur-poly(pyridinopyridine) cell from the prior art.

The use of sulfur-conductive polymer composites as cathodes for lithium batteries has been demonstrated. In one case, polyacrylonitrile (PAN) is sulfurized to form a conductive and chemically active cathode material. The sulfurization of the polymer takes place at a relatively high temperature of ~300° C. An example of the discharge curve for this material is shown in FIG. 24, which was displayed in U.S. Patent Application 2014/0045059 [He, X.-M., et. al.] as FIG. 6. FIG. 24 shows the typical voltage signature seen for Li/Sulfur-Polyacrylonitrile (S/PAN) cells. These cells are typified by a single sloping voltage plateau, with an average voltage below 2.0 V. In comparison to the voltage curve observed in FIG. 19 for the Li/composite polymer-sulfur cathode in a cell of the invention, it can be seen that the S/PAN cells display significantly lower voltage throughout discharge, which results in a lower energy density, based on Watt-hours. Thus, the voltage behavior displayed by the composite polymer polymer-sulfur cathode of the invention is superior to that of the sulfurized PAN-based cathodes.

Comparative Example 8

An example of a Lithium/Sulfur coin cell cycle test is provided in the literature [Urbonaite, S.; Novak, P. *J. Power Sources* 2014, 249, 497-502]. The sulfur cathode utilized a standard carbon black material, comparable to the carbon used in the cathodes of the present invention. The electrolyte, separator and lithium anode in the *J. Power Sources* paper were all identical to the materials used in the cells of the present invention. The difference is that the cathode in the *J. Power Sources* paper did not contain the solid ionically conducting polymer material of the present invention. Thus, this literature example provides a good comparison to the cells using the cathodes incorporating polymer-electrolyte of the present invention. The cycle life curve for the comparison Li/sulfur coin cell is displayed in FIG. 25. Notably, the literature cell provided only about 500 cycles to the same capacity as the invention cell at over 1000 cycles. Therefore, the cell of the present invention provided approximately twice the cycle life of the literature example.

While the present invention has been described in conjunction with preferred embodiments, one of ordinary skill, after reading the foregoing specification, will be able to effect various changes, substitutions of equivalents, and other alterations to that set forth herein. It is therefore intended that the protection granted by Letters Patent hereon be limited only by the definitions contained in the appended claims and equivalents thereof.

What is claimed is:

1. A cathode electrode comprising:
an active material including sulfur; and
a solid, ionically conductive polymer;
wherein the solid, ionically conductive polymer consisting of a reactant product of a base polymer, an electron acceptor, and a compound including a source of ions has an ionic conductivity of at least $1 \times 10^{-4}$ S/cm at a room temperature; and
wherein the ionic conductivity of the solid, ionically conductive polymer does not increase more than one half one order of magnitude when a temperature of the solid, ionically conductive polymer is increased from the room temperature up to a temperature of 97° C.

2. An electrochemical cell comprising:
an anode; and
a cathode;
wherein said cathode comprises sulfur as an active material and a solid, ionically conductive polymer;
wherein the solid, ionically conductive polymer consisting of a reactant product of a base polymer, an electron acceptor, and a compound including a source of ions has an ionic conductivity of at least $1 \times 10^{-4}$ S/cm at a room temperature; and
wherein the ionic conductivity of the solid, ionically conductive polymer does not increase more than one half one order of magnitude when a temperature of the solid, ionically conductive polymer is increased from the room temperature up to a temperature of 97° C.

3. The cathode electrode of claim 1, wherein the solid, ionically conductive polymer has a Lithium cation diffusivity greater than $1 \times 10^{-11}$ meters squared per second at the room temperature.

4. The cathode electrode of claim 1 further comprising electrically conductive fillers.

5. The cathode electrode of claim 1, wherein the solid, ionically conductive polymer encapsulates at least one particle of the active material.

6. The cathode electrode of claim 1, wherein the solid, ionically conductive polymer is formed from the base polymer being oxidatively doped with the electron acceptor in the presence of the compound including the source of ions including Li+ groups.

7. The cathode electrode of claim 1, wherein the compound including the source of ions is selected from the group consisting of LiOH, $Li_2O$, and a mixture of the aforementioned.

8. The cathode electrode of claim of claim 6,
wherein the base polymer can be oxidized; and
wherein the base polymer is a conjugated polymer.

9. The cathode electrode of claim 1, wherein the base polymer is selected from a group consisting of a polyphenylene sulfide, a liquid crystal polymer, a polyelectrode ether ether ketone (PEEK), a semicrystalline polymer with a crystallinity index of greater than 30%, and a combination of at least two of the aforementioned.

10. The cathode electrode of claim 1, wherein the electron acceptor is selected from a group consisting of Dichloro Dicyano Quinone ($C_8Cl_2N_2O_2$), Tetracyanoethylene or TCNE ($C_6N_4$), Sulfur Trioxide ($SO_3$), Tetrachloro-1,4-benzoquinone or Chloranil ($C_6Cl_4O_2$), and a combination of at least two of the aforementioned.

11. The cathode electrode of claim 1, wherein the solid, ionically conductive polymer is electrically insulative.

12. The electrochemical cell of claim 2, wherein the solid, ionically conductive polymer has a Lithium cation diffusivity greater than $1 \times 10^{-11}$ meters squared per second at the room temperature.

13. The electrochemical cell of claim 2, wherein the cathode further comprises electrically conductive fillers.

14. The electrochemical cell of claim 2, wherein the solid, ionically conductive polymer encapsulates at least one particle of the active material.

15. The electrochemical cell of claim 2, wherein the solid, ionically conductive polymer is formed from the base polymer being oxidatively doped with the electron acceptor in the presence of the compound including the source of ions including Li+ groups.

16. The electrochemical cell of claim 2, wherein the compound including the source of ions is selected from the group consisting of LiOH, $Li_2O$, and a mixture of the aforementioned.

17. The electrochemical cell of claim 15,
wherein the base polymer can be oxidized; and
wherein the base polymer is a conjugated polymer.

18. The electrochemical cell of claim 2, wherein the base polymer is selected from a group consisting of a polyphenylene sulfide, a liquid crystal polymer, a polyelectrode ether ether ketone (PEEK), a semicrystalline polymer with a crystallinity index of greater than 30%, and a combination of at least two of the aforementioned.

19. The electrochemical cell of claim 2, wherein the electron acceptor is selected from a group consisting of Dichloro Dicyano Quinon ($C_8Cl_2N_2O_2$), Tetracyanoethylene or TCNE ($C_6N_4$), Sulfur Trioxide ($SO_3$), Tetrachloro-1,4-benzoquinone or Chloranil ($C_6Cl_4O_2$), and a combination of at least two of the aforementioned.

20. The electrochemical cell of claim 2, wherein the solid, ionically conductive polymer is electrically insulative.

21. The electrochemical cell of claim 2, wherein the cathode has a specific capacity of greater than 500 mA/g.

22. The electrochemical cell of claim 2, wherein the cathode has a specific capacity of greater than 1000 mA/g.

23. The electrochemical cell of claim 2, wherein the cathode has a specific capacity of greater than 1500 mA/g.

24. The electrochemical cell of claim 2, wherein the electrochemical cell has a voltage greater than 1.0 volts.

25. The electrochemical cell of claim 2, wherein the anode is selected from a group consisting of a Lithium, a Tin, a Silicon, a graphite, and an alloy or a mixture of at least two of the aforementioned.

26. The electrochemical cell of claim 2, wherein the cell is a secondary cell.

27. The electrochemical cell of claim 26, wherein the cathode specific capacity is greater than 1000 mA/g.

* * * * *